United States Patent
Hoshino et al.

(10) Patent No.: US 10,351,960 B2
(45) Date of Patent: Jul. 16, 2019

(54) GALVANIZED STEEL SHEET AND METHOD FOR PRODUCING THE SAME

(71) Applicant: JFE STEEL CORPORATION, Tokyo (JP)

(72) Inventors: Katsuya Hoshino, Columbus, OH (US); Shoichiro Taira, Tokyo (JP); Masayasu Nagoshi, Kawasaki (JP); Kazutoshi Hanada, Chiba (JP)

(73) Assignee: JFE Steel Corporation, Tokyo (JP)

( * ) Notice: Subject to any disclaimer, the term of this patent is extended or adjusted under 35 U.S.C. 154(b) by 187 days.

(21) Appl. No.: 15/122,036

(22) PCT Filed: Feb. 27, 2015

(86) PCT No.: PCT/JP2015/001054
§ 371 (c)(1),
(2) Date: Aug. 26, 2016

(87) PCT Pub. No.: WO2015/129283
PCT Pub. Date: Sep. 3, 2015

(65) Prior Publication Data
US 2017/0016121 A1    Jan. 19, 2017

(30) Foreign Application Priority Data

Feb. 27, 2014   (JP) ................................ 2014-036381
Nov. 20, 2014   (JP) ................................ 2014-235497

(51) Int. Cl.

| | |
|---|---|
| *C23C 22/53* | (2006.01) |
| *B32B 15/04* | (2006.01) |
| *C23C 22/83* | (2006.01) |
| *C23C 2/06* | (2006.01) |
| *C23C 2/26* | (2006.01) |
| *C23C 2/40* | (2006.01) |
| *C25D 5/00* | (2006.01) |
| *C23C 28/00* | (2006.01) |
| *B32B 15/18* | (2006.01) |
| *C23C 2/28* | (2006.01) |

(52) U.S. Cl.
CPC ............. *C23C 22/53* (2013.01); *B32B 15/04* (2013.01); *B32B 15/043* (2013.01); *B32B 15/18* (2013.01); *C23C 2/06* (2013.01); *C23C 2/26* (2013.01); *C23C 2/28* (2013.01); *C23C 2/405* (2013.01); *C23C 22/83* (2013.01); *C23C 28/3225* (2013.01); *C23C 28/345* (2013.01); *C25D 5/00* (2013.01)

(58) Field of Classification Search
None
See application file for complete search history.

(56) References Cited

U.S. PATENT DOCUMENTS

| | | | |
|---|---|---|---|
| 2,915,444 A | 12/1959 | Meyer | |
| 2013/0260141 A1* | 10/2013 | Hoshino | C25D 9/10 428/336 |

FOREIGN PATENT DOCUMENTS

| | | |
|---|---|---|
| CN | 101437976 A | 5/2009 |
| JP | 03191093 | 8/1991 |
| JP | H08296017 A | 11/1996 |
| JP | 2000073183 A | 3/2000 |
| JP | 2002256448 | 9/2002 |
| JP | 2003306781 | 10/2003 |
| JP | 2004285468 A | 10/2004 |
| JP | 2007016266 | 1/2007 |
| JP | 2007016267 | 1/2007 |
| JP | 2007119872 A | 5/2007 |
| JP | 2009127077 | 6/2009 |
| JP | 2010077498 A | 4/2010 |
| JP | 2010090464 A | 4/2010 |
| JP | 2010111894 A | 5/2010 |
| WO | WO 2012/043610 * | 4/2012 |
| WO | WO 2015/197430 * | 12/2015 |

OTHER PUBLICATIONS

Machine Translation of JP 2007-016266 Jan. 25, 2007.*
Korean Office Action for Korean Application No. 10-2016-7026480, dated Nov. 13, 2017, including Concise Statement of Relevance of Office Action, 4 pages.
International Search Report nad Written Opinion for International Application PCT/JP2015/001054, dated May 26, 2015, 4 pages.
Extended European Search Report for European Application No. 15755178.9, dated Oct. 20, 2017, 8 pages.
Chinese Office Action for Chinese Application No. 201580010894.5, dated Jan. 31, 2018, including Concise Statement of Search Report, 8 pages.
U.S. Office Action for U.S. Appl. No. 15/121,589, dated Oct. 17, 2018—24 pages.
U.S. Office Action for U.S. Appl. No. 15/526,140, dated Mar. 30, 2016—9 pages.

* cited by examiner

*Primary Examiner* — Robert T Butcher
(74) *Attorney, Agent, or Firm* — RatnerPrestia

(57) ABSTRACT

Provided is a method for producing a galvanized steel sheet that includes an oxide layer forming step of bringing a galvanized steel sheet into contact with an acidic solution containing sulfate ions, then holding the galvanized steel sheet in contact for 1 to 60 seconds, and then washing the galvanized steel sheet with water; and a neutralization treatment step of holding a surface of an oxide layer, which has been formed in the oxide layer forming step, in contact with an alkaline aqueous solution for 0.5 seconds or longer, and then performing washing with water and drying. The alkaline aqueous solution contains 0.1 g/L or more of carbonate ions.

18 Claims, 2 Drawing Sheets

GALVANIZED STEEL SHEET AND METHOD FOR PRODUCING THE SAME

CROSS-REFERENCE TO RELATED APPLICATIONS

This is the U.S. National Phase application of PCT/JP2015/001054, filed Feb. 27, 2015, which claims priority to Japanese Patent Application No. 2014-036381, filed Feb. 27, 2014 and Japanese Patent Application No. 2014-235497, filed Nov. 20, 2014, the disclosures of these applications being incorporated herein by reference in their entireties for all purposes.

TECHNICAL FIELD OF THE INVENTION

The present invention relates to a galvanized steel sheet (zinc or zinc alloy coated steel sheet) that exhibits excellent slidability in press forming and excellent alkali degreasability in automobile manufacturing processes, and to a method for producing the galvanized steel sheet.

Hereinafter, the term "galvanized steel sheet" is also used to describe a galvannealed steel sheet.

BACKGROUND OF THE INVENTION

Galvanized steel sheets are widely used in a wide range of fields, mainly, automobile body applications. In such applications, galvanized steel sheets are press-formed and painted before use.

However, galvanized steel sheets have a drawback in that they have poor press formability compared to cold-rolled steel sheets. This is because sliding resistance of galvanized steel sheets in press dies is larger than that of cold-rolled steel sheets. That is, a galvanized steel sheet does not smoothly flow into a press die at a portion where the sliding resistance between the die and the bead is large, and the steel sheet is likely to break.

A method of applying highly viscous lubricant oil has been widely employed as a method of improving press formability of galvanized steel sheets used. This method has a problem in that oil shortage during press forming results in instable press performance, for example. Accordingly, it is highly desirable to improve press formability of the galvanized steel sheets themselves.

In recent years, attempts have been made to simplify the production processes and reduce the amounts of substances of concern generated in the production processes. In particular, progress has been made on reducing the line length of the alkali degreasing process, which is a process that precedes a painting process, and decreasing the temperature of the working environment in the alkali degreasing process. Steel sheets that have excellent degreasability and do not adversely affect the painting process despite such severe conditions are in demand.

Accordingly, steel sheets that have excellent press formability as well as excellent degreasability under alkali degreasing conditions more stringent than in the related art are desirable as the galvanized steel sheets for automobiles.

One example of a method for improving press formability is a technique of forming a lubricant film or an oxide layer on a surface of a galvanized steel sheet.

Patent Literature 1 discloses a technique of improving press formability and chemical conversion ability by causing Ni oxides to occur on a surface of a zinc coated steel sheet by an electrolytic treatment, an immersion treatment, an application-oxidation treatment, or a heat treatment.

Patent Literatures 2 and 3 each disclose a technique of suppressing adhesion between a hot-dip galvannealed coating layer and a press die and improving slidability by causing a hot-dip galvannealed steel sheet to come into contact with an acidic solution so that an oxide layer mainly composed of Zn oxide is formed on the steel sheet surface.

An example of the method for improving degreasability is to wash a steel sheet with an alkaline solution or a solution containing phosphorus (P).

Patent Literature 4 discloses a technique of improving degreasability by washing a surface of a hot-dip galvannealed steel sheet having an oxide layer with an alkaline solution.

Patent Literature 5 discloses a technique of improving degreasability by washing a surface of a hot-dip galvannealed steel sheet having an oxide layer with a solution containing P.

CITATION LIST

Patent Literature

Patent Literature 1: Japanese Unexamined Patent Application Publication No. 03-191093
Patent Literature 2: Japanese Unexamined Patent Application Publication No. 2002-256448
Patent Literature 3: Japanese Unexamined Patent Application Publication No. 2003-306781
Patent Literature 4: Japanese Unexamined Patent Application Publication No. 2007-016266
Patent Literature 5: Japanese Unexamined Patent Application Publication No. 2007-016267

SUMMARY OF THE INVENTION

According to techniques described in Patent Literatures 1 to 3, the lubricant and the like contained or the surface reaction layer exhibit a lubricating effect and lubrication between a press die and a galvanized steel sheet is improved. However, degreasability these techniques provide has not been good enough to satisfy required properties according.

The techniques described in Patent Literatures 4 and 5 have a degreasability improving effect. However, the effect has not been good enough to satisfy the required properties. Moreover, according to the techniques described in Patent Literatures 4 and 5, the obtained oxide layer reacts with P ions and dissolves; hence, a galvanized steel sheet that has sufficient slidability is difficult to obtain. According to the techniques described in Patent Literatures 4 and 5, unevenness frequently occurs due to a washing treatment, and occurrence of unevenness is causing the yield to decrease. The P ions are one of the substances of concern and are preferably not used.

Aspects of the present invention have been made under the above-described circumstances. An object of aspects of the present invention is to provide a galvanized steel sheet that exhibits a low sliding resistance during press forming, exhibits excellent degreasability even under stringent alkali degreasing conditions (low temperature and short line length conditions), suppresses dissolution of the oxide layer formed, is capable of suppressing occurrence of unevenness due to a washing treatment, and uses treatment solutions free of substances of concern. A method for producing the same is also provided.

The inventors of the present invention have conducted extensive studies to resolve the problems described above. As a result, they have found that the problems can be resolved when the oxide layer has following features: After the oxide layer is neutralized by using an alkaline aqueous solution containing 0.1 g/L or more of carbonate ions, the oxygen intensity measured from the oxide layer and converted into a thickness as a $SiO_2$ film is 20 nm or more (equivalent to the thickness of the oxide layer); and the oxide layer contains Zn in an amount of 50 mg/m² or more, S in an amount of 5 mg/m² or more, and C in an amount of 0.2 mg/m² or more. Thus, aspects of the present invention have been made. More specifically, aspects of the present invention are set forth below.

(1) A galvanized steel sheet including a steel sheet and a galvanized coating layer formed on the steel sheet, in which the coating layer includes an oxide layer in a surface layer, the oxide layer having an average thickness of 20 nm or more, and the oxide layer includes Zn, O, H, S, C, and unavoidable impurities, and contains 50 mg/m² or more of Zn, 5 mg/m² or more of S, and 0.2 mg/m² or more of C.

(2) The galvanized steel sheet described in (1), in which a sulfate group, a carbonate group, and a hydroxyl group exist in the oxide layer.

(3) The galvanized steel sheet described in (1) or (2), in which the oxide layer contains a crystal structure represented by $Zn_4(SO_4)_{1-x}(CO_3)_x(OH)_6 \cdot nH_2O$, where X is a real number in the range of 0<X<1 and n is a real number in the range of 0≤n≤10.

(4) The galvanized steel sheet described in any one of (1) to (3), in which the galvanized steel sheet is a hot-dip galvannealed steel sheet, a hot-dip galvanized steel sheet, or an electrogalvanized steel sheet.

(5) A method for producing the galvanized steel sheet described in any one of (1) to (4), the method including an oxide layer forming step of bringing a galvanized steel sheet into contact with an acidic solution containing 0.3 g/L or more of sulfate ions, then holding the galvanized steel sheet in contact for 1 to 60 seconds, and then washing the galvanized steel sheet with water; and a neutralization treatment step of holding a surface of an oxide layer, which has been formed in the oxide layer forming step, in contact with an alkaline aqueous solution having a pH of 9 to 12 for 0.5 seconds or longer, and then performing washing with water and drying, in which the alkaline aqueous solution contains 0.1 g/L or more of carbonate ions.

(6) The method for producing the galvanized steel sheet described in (5), in which the alkaline aqueous solution has a temperature of 20° C. to 70° C.

(7) The method for producing the galvanized steel sheet described in (5) or (6), in which the acidic solution has a pH buffering action and has a pH-increasing property in the range of 0.003 to 0.5, where the pH-increasing property is defined by an amount (L) of a 1.0 mol/L sodium hydroxide solution needed to increase a pH of 1 L of the acidic solution from 2.0 to 5.0.

(8) The method for producing the galvanized steel sheet described in any one of (5) to (7), in which the acidic solution contains a total of 5 to 50 g/L of at least one salt selected from an acetate, a phthalate, a citrate, a succinate, a lactate, a tartrate, a borate, and a phosphate, and has a pH of 0.5 to 5.0 and a temperature of 20° C. to 70° C.

(9) The method for producing the galvanized steel sheet described in any one of (5) to (8), in which, in the oxide layer forming step, an acidic solution coating weight on a steel sheet surface after contacting the acidic solution is 15 g/m² or less.

(10) The method for producing the galvanized steel sheet described in any one of (5) to (9), in which the galvanized steel sheet is a hot-dip galvannealed steel sheet.

(11) The method for producing the galvanized steel sheet described in any one of (5) to (9), in which the galvanized steel sheet is a hot-dip galvanized steel sheet.

(12) The method for producing the galvanized steel sheet described in any one of (5) to (9), in which the galvanized steel sheet is an electrogalvanized steel sheet.

(13) The method for producing the galvanized steel sheet described in any one of (5) to (12), in which a surface of the galvanized steel sheet is activated by bringing the surface of the galvanized steel sheet into contact with an alkaline aqueous solution before the oxide layer forming step.

(14) The method for producing the galvanized steel sheet described in any one of (5) to (13), in which the galvanized steel sheet is temper rolled before the oxide layer forming step.

Aspects of the present invention provide a galvanized steel sheet that exhibits a low sliding resistance during press forming and exhibits excellent degreasability under stringent alkali degreasing conditions.

According to aspects of the present invention, the oxide layer formed in the oxide layer forming step in the method for producing a galvanized steel sheet does not easily dissolved in the neutralization step. As a result, according to aspects of the present invention, a galvanized steel sheet can be obtained with suppressed appearance unevenness.

According to aspects of the present invention, the treatment solution used in the neutralization step contains carbonate ions. Thus, substances of concern such as P ion and the like do not have to be contained.

DETAILED DESCRIPTION OF EMBODIMENTS OF THE INVENTION

Figure 1:
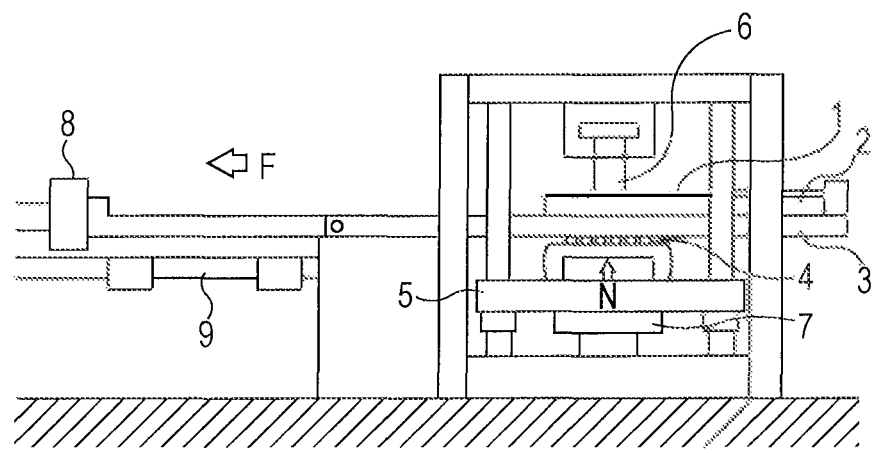
FIG. 1 is a schematic front view of a friction coefficient measuring instrument.

Embodiments of the present invention will now be described. The present invention is not limited by the embodiments described below.

A method for producing a galvanized steel sheet according to aspects of the present invention is a method for forming a galvanized steel sheet having an oxide layer on its surface. For example, when a commercially available galvanized steel sheet not having an oxide layer on its surface is used as the raw material, the method includes an oxide layer forming step and a neutralization step. When a steel sheet is used as the raw material, a galvanizing step must be provided before the oxide layer forming step.

First, the galvanizing step is described. The galvanizing step is a step of galvanizing a steel sheet. The type of steel of the steel sheet used in this step is not particularly limited. Various types of steel sheets, such as those made of low-carbon steel, ultralow-carbon steel, or IF steel, and hightensile-strength steel sheets containing various alloying elements may be employed as the steel sheet. Both a hot rolled steel sheet and a cold-rolled steel sheet can be used as a base steel sheet.

In the galvanizing step, the galvanizing method is not particularly limited, and a common method such as hot-dip galvanizing method or an electrogalvanizing method can be employed. The treatment conditions of the electrogalvanizing and hot-dip galvanizing are not particularly limited, and preferable conditions may be employed as needed. In the hot-dip galvanizing treatment, the coating bath preferably contains Al from the viewpoint of dross management. The additive element components other than Al are not particularly limited in this case. In other words, the effects of aspects of the present invention are not diminished even when elements such as Pb, Sb, Si, Sn, Mg, Mn, Ni, Ti, Li, and Cu are added or contained in addition to Al.

In the galvanizing step, galvannealing may be conducted after galvanizing. For the purposes of aspects of the present invention, the galvannealing conditions are not particularly limited and preferable conditions may be employed as needed.

When a hot-dip galvannealed steel sheet is used, the area fraction of the flat portions (top faces of protruding parts in the rough surface) of the surface of the hot-dip galvannealed coating layer is preferably 20% to 80%. At an area fraction less than 20%, the contact area between a press die and portions (recessed parts) other than the flat portions increases. This decreases the area fraction of the flat portions, in which the thickness of the oxide layer described below can be unfailingly controlled, relative to the area of the steel sheet that actually comes into contact with the press die. As a result, an effect on improving press formability is diminished. The portions other than the flat portions have a role of retaining press oil during press forming. Accordingly, if the area fraction of the flat portions exceeds 80%, oil shortage is likely to occur during press forming of a hot-dip galvannealed steel sheet, and the effect of improving press formability is diminished.

The flat portions in the surface of the hot-dip galvannealed coating layer are easily identifiable by surface observation with an optical microscope, a scanning electron microscope, or the like. The area fraction of the flat portions in the surface of the hot-dip galvannealed coating layer can be determined by image-processing a photograph taken with the microscope.

In accordance with aspects of the present invention, the commercially available galvanized steel sheet or the galvanized steel sheet obtained as described above may be temper-rolled before the oxide layer forming step. In particular, when a hot-dip galvannealed steel sheet is concerned, temper-rolling the surface flattens the surface and moderates the roughness on the surface. As a result, during press forming, the force required for a die to press down protruding parts of the coating surface is decreased, and the sliding properties can be improved. Due to the difference in reactivity at the steel sheet/coating layer interface during galvannealing, the steel sheet surface of the hot-dip galvannealed steel sheet has roughness. Accordingly, it is important that the steel sheet be temper-rolled so as to notably enhance slidability between a press die and a hot-dip galvannealed steel sheet produced by a method of aspects of the present invention.

In contrast, a hot-dip galvanized steel sheet has a zinc solidification structure and is smooth before temper rolling. Thus, oil retention is low and mold galling easily occurs. The hot-dip galvanized steel sheet is thus brought into contact with a skin pass roll to have particular protruding and recessing features imparted thereto so that direct contact with a die during sliding is reduced and oil retention is improved.

An electrogalvanized steel sheet originally has microscopic protruding and recessing features on the surface and thus does not have to be temper-rolled. However, temper rolling may be conducted.

In accordance with aspects of the present invention, the commercially available galvanized steel sheet or the galvanized steel sheet obtained as described above may be subjected to an activation treatment with an alkaline aqueous solution before the oxide layer forming step. In particular, a typical hot-dip galvanized steel sheet or electrogalvanized steel sheet has an oxide layer (unnecessary oxide layer) as an outermost layer, the oxide layer having a thickness less than 10 nm and being formed of Zn or an impurity element, Al. Removing this unnecessary oxide layer with an alkaline aqueous solution can promote reaction in the subsequent oxide layer forming step and can shorten the time required to form the oxide layer.

The alkaline aqueous solution used in the activation treatment preferably has a pH in the range of 10 to 14. At a pH less than 10, the unnecessary oxide layer may not be completely removed. At a pH exceeding 14, dissolution of the galvanized coating layer is extensive, the surface is darkened, and burnt deposit may occur. The temperature of the alkaline aqueous solution used in the activation treatment is preferably in the range of 20° C. to 70° C. Although the type of the alkaline aqueous solution is not particularly limited, a chemical such as NaOH is preferably used from the cost viewpoint. The alkaline aqueous solution may contain substances other than the elements contained in the zinc coating, such as Zn, Al, and Fe, and other components.

When both temper rolling and a treatment with an alkaline aqueous solution are to be conducted, the order in which they are conducted is not particularly limited.

The subsequent oxide layer forming step is a step of bringing a surface of a galvanized steel sheet into contact with an acidic solution containing sulfuric acid (sulfuric acid present in the acidic solution is in a sulfate ion form and this solution may hereinafter be referred to as a "sulfuric acid acidic solution"), holding the galvanized steel sheet in contact for 1 to 60 seconds, and performing washing with water.

The exact mechanism behind formation of the oxide layer in this step is not clear but can be presumed be as follows. When a steel sheet is brought into contact with a sulfuric acid acidic solution, dissolution of zinc occurs from the steel sheet. The dissolution of zinc induces hydrogen generating reaction at the same time. Thus, as dissolution of zinc proceeds, the hydrogen ion concentration in the solution decreases and the pH of the solution increases as a result. Then an oxide layer mainly composed of Zn is formed on the steel sheet surface as a result.

The portion that comes into contact with a press die during press forming is preferably formed of a substance that is hard and has a high melting point in order to prevent adhesion between a galvanized steel sheet and a press die and improve slidability. The oxide layer formed in the oxide layer forming step is hard and has a high melting point. Accordingly, adhesion to the press die can be prevented and the sliding properties can be effectively improved. In particular, when hot-dip galvannealing is performed, the coating layer is hard and the surface deformation is small. Thus, when an oxide layer is evenly formed on surface flat portions of a temper-rolled hot-dip galvannealed steel sheet, good slidability can be stably obtained.

In contrast, when hot-dip galvanizing or electrogalvanizing that involves large surface deformation is conducted, the total amount of the oxide layer present on the flat portions and recessed portions is an influential factor; thus, an oxide layer is preferably evenly formed on both portions.

During press forming, the oxide layer is worn and scraped as the oxide layer comes into contact with the press die. Thus, the oxide layer is required to have a sufficient thickness without adversely affecting the effects of achieved by aspects of the present invention. The required thickness differs according to the degree of working by press forming. For example, a process which involves large deformation and a process which involves a large contact area between a press die and an oxide layer require thicker oxide layers. In accordance with aspects of the present invention, for example, the thickness of the oxide layer may be adjusted to be in the range of 20 to 200 nm according to the usage and the like. When the average thickness of the oxide layer is 20 nm or more, a galvanized steel sheet exhibiting excellent slidability is obtained. It is more effective to adjust the thickness of the oxide layer to 20 nm or more. This is because even when the oxide layer at the surface layer is worn out during a press forming process in which the contact area between a press die and a workpiece (galvanized steel sheet) is large, the oxide layer remains and slidability is rarely degraded. The upper limit of the oxide layer is not particularly limited. However, when the oxide layer has a thickness larger than 200 nm, the reactivity of the surface decreases significantly, and a chemical conversion film may not be smoothly formed. Accordingly, the thickness of the oxide layer is preferably 200 nm or less. Specific adjustment of the thickness can be performed by appropriately changing the conditions for forming the oxide layer described below.

Specifically, the oxide layer forming step may be performed by bringing the steel sheet into contact with a sulfuric acid acidic solution, holding the steel sheet in contact for a particular time, and performing washing with water and drying. Specific materials used and specific production conditions are as follows.

The pH of the sulfuric acid acidic solution used in the oxide layer forming step may be at a level that can dissolve zinc and form an oxide layer. The pH is adjusted by using sulfuric acid. When sulfuric acid is used, the sulfuric acid acidic solution becomes an acidic solution containing sulfate ions. The sulfate ion concentration in the sulfuric acid acidic solution is preferably 0.3 to 50 g/L. If the sulfate ion concentration is less than 0.3 g/L, the amount of sulfate groups in the oxide decreases, the S content in the oxide layer decreases to less than 5 mg/m², and a crystal structure represented by $Zn_4(SO_4)_{1-x}(CO_3)_x(OH)_6 \cdot nH_2O$ is not smoothly formed. A sulfate ion concentration exceeding 50 g/L is not preferable since this requires higher cost although there is no quality issue.

In accordance with aspects of the present invention, a sulfuric acid acidic solution having a pH buffering action is preferably used among various sulfuric acid acidic solutions. A sulfuric acid acidic solution having a pH buffering action helps prevent an instantaneous increase in pH of the solution and helps form a sufficient amount of oxide layer compared to a sulfuric acid acidic solution that does not have a pH buffering action. When the sulfuric acid acidic solution used has a pH buffering action, an oxide layer having excellent slidability can be stably formed. Thus, the effects achieved by aspects of the present invention are rarely adversely affected even when the solution contains metal ions, inorganic compounds, and the like as intended or as impurities.

The pH buffering action of the sulfuric acid acidic solution can be evaluated in terms of the pH-increasing property defined by the amount (L) of a 1.0 mol/L aqueous sodium hydroxide solution needed to increase the pH of 1 L of the sulfuric acid acidic solution to 2.0 to 5.0. In accordance with aspects of the present invention, this value is preferably in the range of 0.003 to 0.5. If the pH-increasing property is less than 0.003, the pH increases rapidly, a sufficient amount of zinc for forming of an oxide layer does not dissolve, and a sufficient amount of an oxide layer may not be formed. In contrast, when the pH-increasing property exceeds 0.5, dissolution of zinc is sometimes excessively promoted and it may take a long time to form an oxide layer; moreover, the coating layer may be severely damaged and the resulting steel sheet may no longer serve as an initially intended rustproof steel sheet. The pH-increasing property of a sulfuric acid acidic solution having a pH exceeding 2.0 is evaluated by adding an inorganic acid, such as sulfuric acid, having substantially no buffering effect in the pH range of 2.0 to 5.0 is added to the sulfuric acid acidic solution so as to decrease pH to 2.0 for the time being.

An example of the sulfuric acid acidic solution having such a pH buffering action is an aqueous solution that contains a total amount of 5 to 50 g/L of at least one salt selected from acetates such as sodium acetate ($CH_3COONa$), phthalates such as potassium hydrogen phthalate (($KOOC)C_6H_4(COOH)$), citrates such as sodium citrate ($Na_3C_6H_5O_7$) and potassium dihydrogen citrate ($KH_2C_6H_5O_7$), succinates such as sodium succinate ($Na_2C_4H_4O_4$), lactates such as sodium lactate ($CH_3CHOHCO_2Na$), tartrates such as sodium tartrate ($Na_2C_4H_4O_6$), borates, and phosphates. If the concentration is less than 5 g/L, the pH of the solution relatively rapidly increases with dissolution of zinc and thus an oxide layer capable of sufficiently improving slidability may not always be formed. At a concentration exceeding 50 g/L, dissolution of zinc is accelerated, and not only it takes a long time to form an oxide layer but also the coating layer is severely damaged and the steel sheet may no longer serve as an initially intended rustproof steel sheet.

The sulfuric acid acidic solution preferably has a pH of 0.5 to 5.0. When the sulfuric acid acidic solution has an excessively low pH, dissolution of zinc is accelerated but an oxide layer may not be smoothly formed. Thus the pH of the sulfuric acid acidic solution is preferably 0.5 or more. In contrast, when the pH is excessively high, the reaction rate for zinc dissolution may decrease. Thus, the pH of the sulfuric acid acidic solution is preferably 5.0 or less.

The solution temperature of the sulfuric acid acidic solution is preferably 20° C. to 70° C. If the solution temperature is lower than 20° C., it may take a long time for the reaction of generating an oxide layer to complete and the productivity may be degraded. In contrast, at a temperature exceeding 70° C., the reaction proceeds relatively rapidly but treatment unevenness is likely to occur on the steel sheet surface.

The method for bringing the steel sheet into contact with the sulfuric acid acidic solution is not particularly limited. Examples thereof include a method of immersing the steel sheet in a sulfuric acid acidic solution, a method of spraying a sulfuric acid acidic solution onto the steel sheet, and a method of applying a sulfuric acid acidic solution to the steel sheet by using a coating roll. In accordance with aspects of the present invention, a sulfuric acid acidic solution film having a thin liquid film form is preferably formed when the sulfuric acid acidic solution contacts the galvanized steel sheet. If the amount of the sulfuric acid acidic solution present on the steel sheet surface is large, the pH of the solution does not easily increase despite dissolution of zinc, and the possibility of sequential dissolution of zinc is assumed, sometimes taking a long time before formation of an oxide layer. If the amount of the sulfuric acid acidic solution present on the steel sheet surface is large, the hot-dip galvannealed coating layer may become severely damaged and the steel sheet may no longer serve as an initially intended rustproof steel sheet. From this viewpoint, the sulfuric acid acidic solution coating weight is preferably effectively adjusted to 15 g/m$^2$ or less. From the viewpoint of preventing the liquid film from drying, the coating weight is preferably 1 g/m$^2$ or more. The coating weight can be adjusted by using a squeeze roll, air-wiping, or the like. The coating weight of the sulfuric acid acidic solution can be measured with an infrared moisture gauge produced by CHINO CORPORATION. The upper limit of the coating weight is appropriately set according to the desired thickness conditions of the oxide layer, etc.

The time required until start of washing with water after the steel sheet contacts the acidic solution (the holding time until washing with water) needs to be 1 to 60 seconds. If the time until washing with water is less than 1 second, the sulfuric acid acidic solution is washed away before an oxide layer mainly formed of Zn is formed due to an increase in pH of the solution, and thus the slidability improving effect is no longer obtained. The amount of the oxide layer does not change if the time is longer than 60 seconds. This holding is preferably conducted in an atmosphere that has a higher oxygen content than atmospheric air in order to accelerate oxidation.

At the last stage of the oxide layer forming step, washing is performed with water. If washing with water is not performed at this stage, the salt having a pH buffering action present in the acidic treatment solution may inhibit the reaction with an alkaline aqueous solution containing carbonate ions and having pH of 9 to 12 in the subsequent neutralization treatment step. In particular, a sufficient amount of carbonate ions cannot be captured and there is a risk of degradation of degreasability and some of the sliding properties. Accordingly, it is preferable to conduct washing with water for 1 second or longer.

The neutralization treatment performed next is a step of holding a surface of the oxide layer, which has been formed in the oxide layer forming step, in contact with an alkaline aqueous solution for 0.5 seconds or longer, and then performing washing with water and drying. For the purposes of certain aspects of the present invention, an alkaline aqueous solution containing carbonate ions is used as the alkaline aqueous solution.

Because an alkaline aqueous solution containing carbonate ions is brought into contact with the oxide layer, the resulting galvanized steel sheet can exhibit excellent degreasability even under stringent alkali degreasing conditions that involve a low temperature, a short line length, and therefore a short treatment time. The low temperature here means that the temperature is 35° C. to 40° C. Short line length and short treatment time mean that the time is 60 to 90 seconds.

The degreasability improving mechanism is not exactly clear but can be presumed to be as follows. If the sulfuric acid acidic solution remains on the oxide layer surface after washing with water and drying, the amount of the surface etched increases, microscopic roughness is generated, and the affinity between the oxide layer surface and oil is enhanced. Washing the surface with an alkaline aqueous solution and completely conducting neutralization prevent the sulfuric acid acidic solution from remaining on the surface. When carbonate ions are present at this stage, the oxide layer captures the carbonate ions and the crystal structure is changed. At the same time, physical properties change, the affinity between the oxide layer and oil decreases dramatically, and degreasability is significantly improved. Moreover, the oxide film layer capturing the carbonate ions does not easily undergo dissolution reaction during the neutralization treatment step. Since P ions are not necessarily used in aspects of the present invention, the reaction between the oxide layer and P ions that occurs when P ions are used does not occur. Thus, issues such as appearance unevenness and degradation of press forming stability caused by the difference in the oxide layer thickness can be resolved.

The materials used in the neutralization treatment step and the neutralization treatment conditions are as follows.

For the purposes of aspects of the present invention, the carbonate ion concentration in the alkaline aqueous solution must be 0.1 g/L or more from the viewpoint of using carbonate ions. The concentration is preferably in the range of 0.1 g/L to 100 g/L. At a concentration less than 0.1 g/L, it is considered that not enough carbonate ions are captured in the oxide layer and that physical properties cannot be sufficiently changed. From the production cost viewpoint, the carbonate ion concentration is preferably 100 g/L or less.

The substance that serves as a source of carbonate ions is not particularly limited. For example, carbon dioxide blowing, sodium carbonate, sodium hydrogen carbonate, manganese carbonate, nickel carbonate, potassium carbonate, and their hydrates can be used as the carbonate ion sources. Use of carbon dioxide and carbonates listed above as examples is preferable from the viewpoints of cost and availability.

Components other than carbonate ions may be contained as long as the effects of certain aspects of the present invention are not adversely affected. For example, S, N, B, Cl, Na, Zn, Al, Ca, K, Mg, Fe, Mn, Si, etc., may be contained. The total amount of these components is preferably in the range of 0 to 10 g/L.

The pH of the alkaline aqueous solution is 9 to 12. As long as the pH is 9 or more, the neutralization treatment can be satisfactorily carried out. Dissolution of the oxide layer is easily prevented as long as the pH is 12 or less.

The solution temperature of the alkaline aqueous solution in performing the neutralization treatment is not particularly limited. For the purposes of aspects of the present invention, the solution temperature is preferably 20° C. to 70° C. A solution temperature of 20° C. or higher is preferable since the reaction rate increases. A solution temperature of 70° C. or lower is preferable since dissolution of the oxide film is reduced.

The method for bringing the alkaline aqueous solution into contact with the oxide layer is not particularly limited. Examples of the method include a method of immersing an oxide layer in an alkaline aqueous solution to achieve contact, a method of spraying an alkaline aqueous solution onto the oxide layer to achieve contact, and a method of coating an oxide layer with an alkaline aqueous solution by using a coating roll.

In accordance with aspects of the present invention, the time for which the alkaline aqueous solution is in contact with the oxide layer is 0.5 seconds or longer. When the time is set to 0.5 seconds or longer, excellent degreasability can be imparted to the galvanized steel sheet. From the viewpoint of the length of the treatment facility, the time is preferably 10 seconds or shorter.

The configuration of the galvanized steel sheet according to aspects of the present invention will now be described.

The oxide layer is composed of Zn, O, H, S, C, and unavoidable impurities, and contains 50 mg/m² or more of Zn, 5 mg/m² or more of S, and 0.2 mg/m² or more of C.

The Zn content needs to be 50 mg/m² or more and the S content needs to be 5 mg/m² or more from the viewpoint of slidability. The Zn content is preferably 1000 mg/m² or less and the S content is preferably 100 mg/m² or less from the viewpoints of weldability and chemical conversion ability. In order to adjust the Zn content and the S content to be in the above-described ranges, the production conditions are employed under which the zinc coated steel sheet is brought into contact with the sulfuric acid acidic treatment solution (acidic solution), held in contact for 1 to 60 seconds, and washed with water.

The C content needs to be 0.2 mg/m² or more from the viewpoints of degreasability, appearance unevenness, and stability of press forming. The C content is preferably 40 mg/m² or less from the viewpoints of weldability and chemical conversion ability.

The oxide layer contains H. The quantitative analysis of H is difficult; however, an X-ray photoelectron spectrometer can confirm presence of H through analysis of the existence form of Zn. When Zn is present as $Zn(OH)_2$ and narrow scan measurement of a spectrum corresponding to Zn LMM by using an Al Ka monochromatic source is conducted, a peak is observed near 987 eV. This confirms presence of H and OH groups. The H content is not particularly specified. Since H exists as OH, the H content is considered to increase with the increasing oxygen content.

A sulfate group, a carbonate group, and a hydroxyl group preferably exist in the oxide layer from the viewpoint of film stability. When production conditions are employed under which the zinc coated steel sheet is brought into contact with the sulfuric acid acidic treatment solution, held in contact for 1 to 60 seconds, washed with water, and brought into contact with an alkaline aqueous solution containing carbonate ions, the oxide layer comes to contain a sulfate group, a carbonate group, and a hydroxyl group.

The oxide layer preferably contains a crystal structure represented by $Zn_4(SO_4)_{1-x}(CO_3)_x(OH)_6 \cdot nH_2O$. Here, X represents a real number in the range of $0<X<1$ and n represents a real number in the range of $0 \leq n \leq 10$. When this crystal structure is contained, the effect of improving sliding properties due to slip deformation of the layered crystal is obtained. In order to obtain this effect, the crystal structure content is preferably at a level that can be confirmed through Examples described below. This particularly contributes to improving the initial slip deformability and has a large influence on static friction coefficient and the like. When production conditions are employed under which the zinc coated steel sheet is brought into contact with the sulfuric acid acidic treatment solution, held in contact for 1 to 60 seconds, washed with water, and brought into contact with an alkaline aqueous solution containing carbonate ions, the oxide layer comes to contain a crystal structure represented by $Zn_4(SO_4)_{1-x}(CO_3)_x(OH)_6 \cdot nH_2O$.

The oxide layer may contain a metal oxide and/or a hydroxide of elements other than Zn, and other components. The oxide layer may capture S, N, P, B, Cl, Na, Mn, Ca, Mg, Ba, Sr, Si, and the like due to impurities contained in the sulfuric acid acidic solution.

The oxide layer formed according to aspects of the present invention can be analyzed by the methods described below.

The thickness of the oxide layer is measured by fluorescent X-ray analysis in which the obtained oxygen intensity is converted into a silica film thickness on the basis of the value of a silicon wafer having an silicon oxide film of a known thickness formed thereon.

The metal ions of Zn, S, and other metals contained in the oxide layer can be quantitatively determined by analyzing a solution, prepared by dissolving the oxide layer in an ammonium dichromate 2%/ammonia water 14% solution (% means % by mass), by using an ICP emission spectrometer. Regarding carbon (C) contained in the oxide layer, the film components can be extracted as powdered components by rubbing the surface of the oxide layer with a stainless steel brush having a diameter of 0.2 mm or less and a length of 40 mm or more and ethanol, and suction-filtering the obtained ethanol solution. The carbon content can then be determined by analyzing the extracted substance with a gas chromatograph mass spectrometer through a programmed temperature analysis.

The existence form of C can be analyzed by conducting gas chromatograph mass spectroscopy on a powdered oxide layer component prepared in the same manner.

Water of crystallization can be analyzed by analyzing the powdered oxide layer component, which is prepared in the same manner, with a differential thermogravimetric analyzer. The decrease in weight at 100° C. or lower corresponds to the water of crystallization. Water of crystallization refers to water molecules captured inside the crystal.

The existence forms of S, Zn, and O can be analyzed by an X-ray photoelectron spectrometer.

The crystal structure can be identified on the basis of the diffraction peaks of the oxide layer obtained in X-ray diffraction.

EXAMPLE 1

The present invention will now be described through Examples which do not limit the scope of the present invention.

A cold-rolled steel sheet having a thickness of 0.7 mm was subjected to a hot-dip galvanizing treatment and a galvannealing treatment. The resulting steel sheet was temper rolled. Subsequently, an oxide layer forming treatment was performed in which the steel sheet was immersed in a sulfuric acid acidic solution controlled to the conditions shown in Table 1 (Table 1-1 and Table 1-2 are together referred to as Table 1), roll-squeezed, and then held for a particular time shown in Table 1. Then the resulting steel sheet was thoroughly washed with water and dried. A neutralization treatment was then conducted under the conditions shown in Table 1.

The sulfate ion concentration was 15 g/L in Nos. 2 to 8, Nos. 19 to 38, and Nos. 48 to 55 in Table 1. The sulfate ion concentration was 0.5 to 30 g/L in Nos. 9 to 18 and 41 to 47. The sulfate ion concentration was 0 g/L in Nos. 39 and 40.

The hot-dip galvannealed steel sheet obtained as above was analyzed to determine the thickness of the oxide layer on the surface and other details. Press formability (sliding properties), degreasability, and appearance unevenness were evaluated. The evaluation methods were as follows.

(1) Analysis of Oxide Layer

Analysis of Thickness of Oxide Layer

The thickness of an oxide layer formed on a hot-dip galvannealed steel sheet was measured with a fluorescent X-ray analyzer. The voltage and the current of the tube bulb during measurement was 30 kV and 100 mA, respectively, the dispersive crystal was set to TAP, and the O-Kα line was detected. In measuring the O-Kα line, the intensity at the background position was measured in addition to the intensities at the peak positions so that the net intensity of the O-Kα line could be calculated. The integral time at each of the peak positions and background position was 20 seconds.

Silicon wafers, which had been cleaved into an appropriate size and had silicon oxide films 96 nm, 54 nm, and 24 nm in thickness respectively formed thereon, were placed on a sample stage along with a set of samples described above so that the intensity of the O-Kα line could be calculated from these silicon oxide films as well. The obtained data was used to plot calibration curves of the oxide layer thickness verses the O-Kα line intensity. The thickness of the oxide layer of the sample was then determined as the oxide layer thickness obtained by conversion on the basis of the silicon oxide films.

Compositional Analysis of Oxide Layer

Only the oxide layer was dissolved by using an ammonium dichromate 2%/ammonia water 14% solution (% means % by mass). The resulting solution was subjected to quantitative analysis for Zn and S through ICP emission spectrometry.

The surface of the oxide layer was rubbed with a stainless steel brush having a diameter of 0.15 mm and a length of 45 mm and ethanol, and the obtained ethanol solution was suction-filtered to extract the film components as powdered components. The film components obtained as powder were subjected to programmed temperature analysis with a gas chromatograph mass spectrometer to quantitatively determine C. A pyrolysis oven was connected upstream of the gas chromatograph mass spectrometer. About 2 mg of the powdered sample taken was inserted into the pyrolysis oven, and the temperature of the pyrolysis oven was elevated from 30° C. to 500° C. at an elevation rate of 5° C./min. The gas generated in the pyrolysis oven was transported into a gas chromatograph mass spectrometer by using helium, and the gas composition was analyzed. The column temperature during the GC/MS measurement was set to 300° C.

Existence Form of C

The film components powdered and sampled in the same manner were analyzed with a gas chromatograph mass spectrometer so as to determine the existence form of C.

Existence Forms of Zn, S, and O

An X-ray photoelectron spectrometer was used to analyze the existence forms of Zn, S, and O. An Al Kα monochromic line source was used to conduct narrow scan measurement on spectra corresponding to Zn LMM and S 2p.

Quantitative Determination of Water of Crystallization

A differential thermogravimetric analyzer was used to measure the decrease in weight at 100° C. or lower. About 15 mg of the powdered sample was used in the measurement. After the sample was introduced into the analyzer, the temperature was elevated from room temperature (about 25° C.) to 1,000° C. at a temperature elevating rate of 10° C./min, and the thermogravimetric changes during temperature elevation were recorded.

Identifying Crystal Structure

The film components powdered and sampled in the same manner were subjected to X-ray diffraction to predict the crystal structure. Cu was used as the target, and the measurement was conducted under the conditions of acceleration voltage: 40 kV, tube current: 50 mA, scan rate 4 deg/min, and scan range: 2° to 90°.

(2) Method for Evaluating Press Formability (Sliding Properties)

Friction coefficients of each sample were measured as below so as to evaluate press formability.

(i) Dynamic Friction Coefficient Measurement Test: Drawn Parts and Inflow Parts are Targeted FIG. 1 is a schematic front view of a friction coefficient measurement instrument. As shown in this drawing, a sample 1 for measuring a friction coefficient taken from a sample material is fixed to a sample table 2, and the sample table 2 is fixed to an upper surface of a slide table 3 capable of horizontal movement. A slide table supporting stage 5 movable in vertical directions is disposed on the lower surface of the slide table 3, and has a roller 4 in contact with the slide table 3. A first load cell 7, which is configured to push up the slide table supporting stage 5 to measure the pressing load N of a bead 6 to the sample 1 for measuring a friction coefficient, is installed onto the slide table supporting stage 5. A second load cell 8, which is configured to measure sliding resistance force F generated by moving the slide table 3 in a horizontal direction while the pressing force is active, is installed at one end of the slide table 3. The test was conducted by applying a lubricant oil, which is Wash Oil for Press Forming PRETON R352L produced by Sugimura Chemical Industrial Co., Ltd., to a surface of the sample 1.

Figure 2:
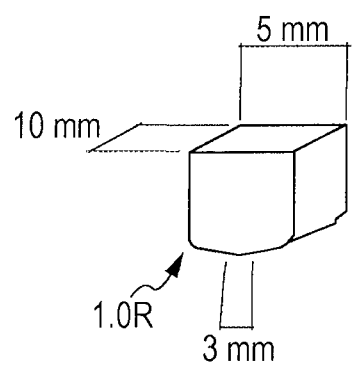
FIG. 2 is a schematic perspective view showing the shape and dimensions of a bead used in Condition 1 of Examples.
Figure 3:
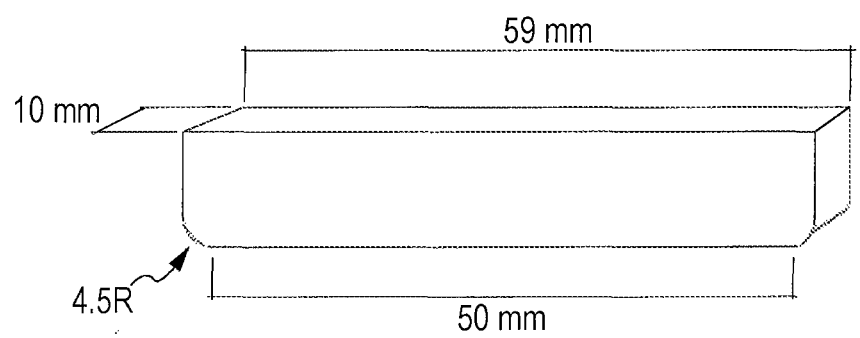
FIG. 3 is a schematic perspective view showing the shape and dimensions of a bead used in Condition 2 of Examples.

FIGS. 2 and 3 are schematic perspective views illustrating the shape and dimensions of the bead used. The slide table 3 slides while the lower surface of the bead 6 is being pressed against the surface of the sample 1. The shape of the bead 6 shown in FIG. 2 has a width of 10 mm, a length of 5 mm in a sliding direction of the sample, and a curvature of 1 mmR at curved surfaces at lower portions at two ends in the sliding direction. The bead lower surface to be pressed against the sample is a flat surface having a width of 10 mm and a length of 3 mm in the sliding direction. The shape of the bead 6 shown in FIG. 3 has a width of 10 mm, a length of 59 mm in the sliding direction of the sample, and a curvature of 4.5 mmR at curved surfaces at lower portions at two ends in the sliding direction. The bead lower surface to be pressed against the sample is a flat surface having a width of 10 mm and a length of 50 mm in the sliding direction.

The friction coefficient measurement test was conducted under the following two conditions:

[Condition 1]

The bead shown in FIG. 2 was used. Pressing load N: 400 kgf; sample pull-out rate (horizontal movement speed of slide table 3): 100 cm/min.

[Condition 2]

The bead shown in FIG. 3 was used. Pressing load N: 400 kgf; sample pull-out rate (horizontal movement speed of slide table 3): 20 cm/min.

The friction coefficient between the sample material and the bead was calculated from the formula: =F/N.

Figure 4:
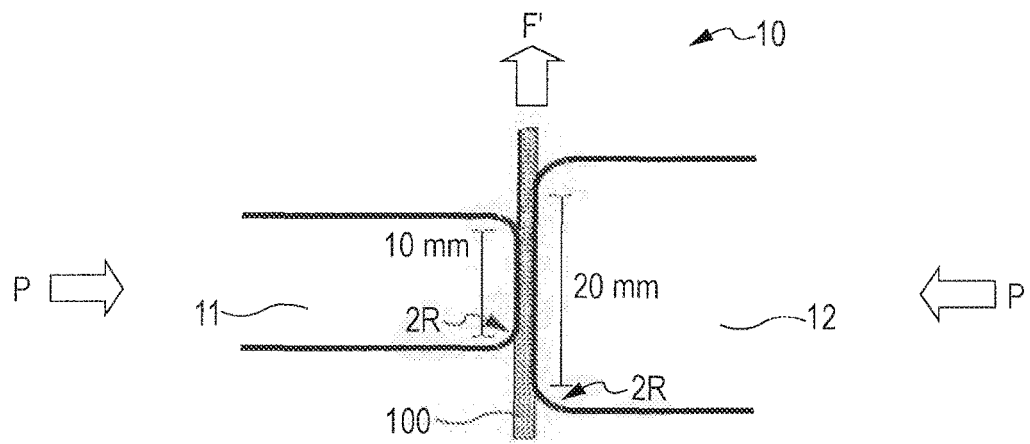
FIG. 4 is a schematic perspective view showing the shape and dimensions of a bead used in Condition 3 of Examples.

(ii) Static Friction Coefficient Measurement Test: Stretch-Formed Parts were Targeted A press-forming simulation clarified that the static friction coefficient has a higher relevancy with the actual press formability than the dynamic friction coefficient for parts that have a contact pressure of 7 MPa or less and a sliding speed of 50 mm/min or less (such as stretch-formed parts). In order to evaluate press formability (in particular, formability of the stretch formed parts), the static friction coefficient of each sample material was measured as follows. FIG. 4 is a schematic view of a static friction coefficient measurement instrument that uses a tester 10. As illustrated in this drawing, a sample 100 for measuring static friction coefficient taken from a sample material was pressed against dies 11 and 12 at a constant load P of 370 kgf. Then the sample 100 held between the dies 11 and 12 were pulled out at a speed of 10 mm/min. With this procedure, the constant load P and the load F' required to pulled out the sample 100 were measured at an interval of 0.005 Hz. The static friction coefficient was calculated from the formula: $\mu=F'/P$, and the friction coefficient of the peak value after start of sliding was acquired as the static friction coefficient. The shape of the die 11 had a width of 35 mm, a length of 14 mm in the sliding direction of the sample, and a curvature of 2 mmR at curved surfaces at lower portions at two ends in the sliding direction. The bead lower surface to be pressed against the sample was a flat surface having a width of 35 mm and a length of 10 mm in the sliding direction. The shape of the die 12 had a width of 35 mm, a length of 24 mm in the sliding direction of the sample, and a curvature of 2 mmR at curved surfaces at lower portions at two ends in the sliding direction. The bead lower surface to be pressed against the sample was a flat surface having a width of 35 mm and a length of 20 mm in the sliding direction (referred to as Condition 3 hereinafter). The test was conducted by applying a lubricant oil, which is Wash Oil for Press Forming PRETON (registered trademark) R352L produced by Sugimura Chemical Industrial Co., Ltd., to a surface of the sample 100.

(3) Method for Evaluating Degreasability

Degreasability was evaluated on the basis of wetting ratio after degreasing. Wash Oil for Press Forming PRETON R352L produced by Sugimura Chemical Industrial Co., Ltd., was applied to the prepared test piece at a coating weight of 2.0 g/m² per side, and the sample was degreased with an alkali degreasing solution, FC-L4460 produced by NIHON PARKERIZING CO., LTD. To the degreasing solution, 10 g/L of Wash Oil for Press Forming PRETON R352L produced by Sugimura Chemical Industrial Co., Ltd., was added in advance so as to simulate deterioration of the alkali degreasing solution in automobile manufacturing lines. The degreasing time was set to 60 seconds and the temperature was set to 37° C. During degreasing, the degreasing solution was stirred at a rate of 150 rpm with a propeller having a diameter of 10 cm. The wetting ratio of the test piece was measured 20 seconds after completion of degreasing so as to evaluate degreasability.

(4) Evaluation of Appearance Unevenness

Figure 5:
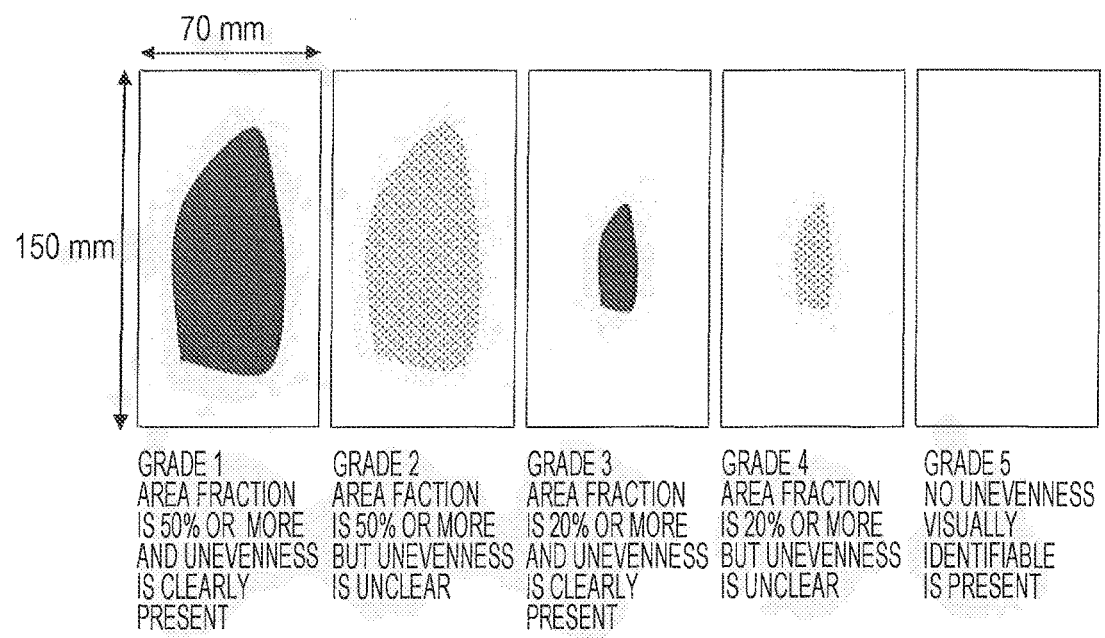
FIG. 5 is a diagrams indicating evaluation criteria for evaluating appearance unevenness.

The appearance unevenness was visually evaluated. The appearance samples shown in FIG. 5 were used as the criteria and evaluation was given from Grade 1 to Grade 5. Samples rated Grade 4 or higher are considered excellent, and samples rated Grade 5 are considered more excellent.

Grade 1: Area fraction is 50% or more and unevenness is clearly present.
Grade 2: Area faction is 50% or more but unevenness is unclear.
Grade 3: Area fraction is 20% or more and unevenness is clearly present.
Grade 4: Area fraction is 20% or more but unevenness is unclear.
Grade 5: No unevenness visually identifiable is present.

The results obtained as above are shown in Table 2 (Table 2-1 and Table 2-2 are together referred to as Table 2).

TABLE 1-1

| | Oxide layer forming treatment | | | | | | | |
|---|---|---|---|---|---|---|---|---|
| | Acidic solution | | | | | Coating weight of | | |
| | pH Buffer | | pH Adjustor | | pH- | | acidic | Holding | |
| No. | Type of chemical | Concentration (g/L) | Type of chemical | pH | increasing property | Temperature (° C.) | solution film (g/m²) | time (sec) | Washing with water |
| 1 | No treatment | — | — | — | — | — | — | — | — |
| 2 | Sodium acetate•Trihydrate | 30 | Sulfuric acid | 1.5 | 0.20 | 35 | 5 | 10 | Yes |
| 3 | | | | | | | | 10 | |
| 4 | Sodium acetate•Trihydrate | 30 | Sulfuric acid | 1.5 | 0.20 | 35 | 5 | 3 | Yes |
| 5 | | | | | | | | 5 | |
| 6 | | | | | | | | 10 | |
| 7 | | | | | | | | 30 | |
| 8 | | | | | | | | 60 | |
| 9 | Sodium acetate•Trihydrate | 30 | Sulfuric acid | 0.8 | 0.20 | 35 | 5 | 10 | Yes |
| 10 | | | | 1.0 | | | | | |
| 11 | | | | 1.2 | | | | | |
| 12 | | | | 1.5 | | | | | |
| 13 | | | | 2.0 | | | | | |
| 14 | | | | 3.0 | | | | | |
| 15 | Sodium acetate•Trihydrate | 0 | Sulfuric acid | 1.5 | 0.03 | 35 | 5 | 10 | Yes |
| 16 | | 5 | | | 0.08 | | | | |
| 17 | | 20 | | | 0.16 | | | | |
| 18 | | 50 | | | 0.48 | | | | |
| 19 | Sodium acetate•Trihydrate | 30 | Sulfuric acid | 1.5 | 0.20 | 20 | 5 | 10 | Yes |
| 20 | | | | | | 50 | | | |
| 21 | | | | | | 70 | | | |
| 22 | Sodium acetate•Trihydrate | 30 | Sulfuric acid | 1.5 | 0.20 | 10 | 1 | 10 | Yes |
| 23 | | | | | | | 5 | | |
| 24 | | | | | | | 10 | | |
| 25 | | | | | | | 15 | | |

TABLE 1-1-continued

| | Neutralization treatment | | | | | | |
|---|---|---|---|---|---|---|---|
| | Alkaline aqueous solution Chemicals added and concentration | | Carbonate ion | | | | |
| No. | Type of chemical | Concentration (g/L) | concentration (g/L) | pH | Stirring (rpm) | Temperature (° C.) | Immersion time (sec) |
| 1 | — | — | — | — | — | — | — |
| 2 | None | — | — | 67 | 150 | 50 | 3 |
| 3 | Sodium pyrophosphate | 9.8 | 0.00 | 10.17 | 150 | 50 | 3 |
| 4 | Sodium carbonate•Decahydrate | 2.86 | 0.60 | 10.54 | 150 | 50 | 3 |
| 5 | | | | | | | |
| 6 | | | | | | | |
| 7 | | | | | | | |
| 8 | | | | | | | |
| 9 | Sodium carbonate•Decahydrate | 2.86 | 0.60 | 10.54 | 150 | 50 | 3 |
| 10 | | | | | | | |
| 11 | | | | | | | |
| 12 | | | | | | | |
| 13 | | | | | | | |
| 14 | | | | | | | |
| 15 | Sodium carbonate•Decahydrate | 2.86 | 0.60 | 10.54 | 150 | 50 | 3 |
| 16 | | | | | | | |
| 17 | | | | | | | |
| 18 | | | | | | | |
| 19 | Sodium carbonate•Decahydrate | 2.86 | 0.60 | 10.54 | 150 | 50 | 3 |
| 20 | | | | | | | |
| 21 | | | | | | | |
| 22 | Sodium carbonate•Decahydrate | 2.86 | 0.60 | 10.54 | 150 | 50 | 3 |
| 23 | | | | | | | |
| 24 | | | | | | | |
| 25 | | | | | | | |

TABLE 1-2

| | Oxide layer forming treatment | | | | | | | | |
|---|---|---|---|---|---|---|---|---|---|
| | Acidic solution | | | | | | Coating weight of | | |
| | pH Buffer | | pH Adjustor | | pH- | | acidic | | |
| No. | Type of chemical | Concentration (g/L) | Type of chemical | pH | increasing property | Temperature (° C.) | solution film (g/m$^2$) | Holding time (sec) | Washing with water |
| 26 | Sodium acetate•Trihydrate | 30 | Sulfuric acid | 1.5 | 0.20 | 10 | 5 | 10 | Yes |
| 27 | | | | | | | | | |
| 28 | | | | | | | | | |
| 29 | | | | | | | | | |
| 30 | | | | | | | | | |
| 31 | | | | | | | | | |
| 32 | Sodium acetate•Trihydrate | 30 | Sulfuric acid | 1.5 | 0.20 | 10 | 5 | 10 | Yes |
| 33 | | | | | | | | | |
| 34 | | | | | | | | | |
| 35 | | | | | | | | | |
| 36 | Sodium acetate•Trihydrate | 30 | Sulfuric acid | 1.5 | 0.20 | 10 | 5 | 10 | Yes |
| 37 | | | | | | | | | |
| 38 | | | | | | | | | |
| 39 | Sodium acetate•Trihydrate | 30 | Hydrochloric acid | 0.8 | 0.20 | 10 | 5 | 10 | Yes |
| 40 | | | Nitric acid | | | | | | |
| 41 | Potassium phthalate | 30 | Sulfuric acid | 1.5 | 0.42 | 10 | 5 | 10 | Yes |
| 42 | Trisodium citrate dihydrate | | | | 0.34 | | | | |
| 43 | Disodium succinate hexahydrate | | | | 0.62 | | | | |
| 44 | Sodium lactate | | | | 0.41 | | | | |
| 45 | Sodium tartrate dihydrate | | | | 0.48 | | | | |
| 46 | Sodium borate decahydrate | | | | 0.53 | | | | |
| 47 | Trisodium phosphate•dodecahydrate | | | | 0.55 | | | | |
| 48 | Sodium acetate•Trihydrate | 30 | Sulfuric acid | 1.5 | 0.20 | 10 | 5 | 10 | Yes |
| 49 | | | | | | | | | |
| 50 | | | | | | | | | |
| 51 | | | | | | | | | |

TABLE 1-2-continued

| | | | | | | | | | | |
|---|---|---|---|---|---|---|---|---|---|---|
| 52 | Sodium acetate•Trihydrate | | 30 | Sulfuric acid | 1.5 | 0.20 | 10 | 5 | 10 | Yes |
| 53 | | | | | | | | | | |
| 54 | | | | | | | | | | |
| 55 | Sodium acetate•Trihydrate | | 30 | Sulfuric acid | 1.5 | 0.20 | 35 | 5 | 10 | None |

| | | Neutralization treatment | | | | | | |
|---|---|---|---|---|---|---|---|---|
| | | Alkaline aqueous solution Chemicals added and concentration | | Carbonate ion | | | | Immersion |
| No. | Type of chemical | | Concentration (g/L) | concentration (g/L) | pH | Stirring (rpm) | Temperature (° C.) | time (sec) |
| 26 | Sodium carbonate•Decahydrate | | 0.24 | 0.05 | 10.22 | 150 | 50 | 3 |
| 27 | | | 0.48 | 0.10 | 10.25 | | | |
| 28 | | | 2.86 | 0.60 | 10.54 | | | |
| 29 | | | 5.72 | 1.20 | 10.58 | | | |
| 30 | | | 28.60 | 6.00 | 10.73 | | | |
| 31 | | | 57.20 | 12.00 | 10.83 | | | |
| 32 | Sodium carbonate•Decahydrate | | 2.86 | 0.60 | 10.54 | 150 | 50 | 0.5 |
| 33 | | | | | | | | 1.5 |
| 34 | | | | | | | | 5 |
| 35 | | | | | | | | 10 |
| 36 | Sodium carbonate•Decahydrate | | 2.86 | 0.60 | 10.54 | 150 | 20 | 3 |
| 37 | | | | | | | 30 | |
| 38 | | | | | | | 70 | |
| 39 | Sodium carbonate•Decahydrate | | 2.86 | 0.60 | 10.54 | 150 | 50 | 3 |
| 40 | | | | | | | | |
| 41 | Sodium carbonate•Decahydrate | | 2.86 | 0.60 | 10.54 | 150 | 50 | 3 |
| 42 | | | | | | | | |
| 43 | | | | | | | | |
| 44 | | | | | | | | |
| 45 | | | | | | | | |
| 46 | | | | | | | | |
| 47 | | | | | | | | |
| 48 | Carbon dioxide | | 2.20 | 3.00 | 10.54 | 150 | 50 | 3 |
| 49 | Manganese carbonate | | 6.40 | 3.00 | | | | |
| 50 | Nickel carbonate | | 12.43 | 3.00 | | | | |
| 51 | Potassium carbonate | | 6.90 | 3.00 | | | | |
| 52 | Sodium hydrogen | | 0.42 | 0.30 | 8.35 | 150 | 50 | 3 |
| 53 | carbonate | | 4.20 | 3.00 | 8.25 | | | |
| 54 | | | 8.40 | 6.00 | 8.15 | | | |
| 55 | Sodium carbonate•Decahydrate | | 2.86 | 0.60 | 10.54 | 150 | 50 | 3 |

TABLE 2-1

| | Oxide layer analytic results | | | | | | | |
|---|---|---|---|---|---|---|---|---|
| No. | Thickness (O) (nm) | Zn (mg/m$^2$) | S (mg/m$^2$) | C (mg/m$^2$) | Existence of zinc hydroxide | Existence of sulfate | Existence of carbonate | Incorporation of crystal structure |
| 1 | 8 | 21 | 0.0 | 0.0 | X | X | X | X |
| 2 | 31 | 82 | 10.1 | 0.0 | ○ | ○ | X | X |
| 3 | 15 | 40 | 4.9 | 0.0 | ○ | ○ | X | X |
| 4 | 21 | 55 | 5.5 | 0.5 | ○ | ○ | ○ | ○ |
| 5 | 25 | 66 | 6.5 | 0.6 | ○ | ○ | ○ | ○ |
| 6 | 31 | 82 | 8.1 | 0.8 | ○ | ○ | ○ | ○ |
| 7 | 46 | 121 | 12.0 | 1.1 | ○ | ○ | ○ | ○ |
| 8 | 63 | 166 | 16.4 | 1.5 | ○ | ○ | ○ | ○ |
| 9 | 45 | 119 | 11.7 | 1.1 | ○ | ○ | ○ | ○ |
| 10 | 42 | 111 | 10.9 | 1.0 | ○ | ○ | ○ | ○ |
| 11 | 38 | 100 | 9.9 | 0.9 | ○ | ○ | ○ | ○ |
| 12 | 31 | 82 | 8.1 | 0.8 | ○ | ○ | ○ | ○ |
| 13 | 28 | 74 | 7.3 | 0.7 | ○ | ○ | ○ | ○ |
| 14 | 27 | 71 | 7.0 | 0.7 | ○ | ○ | ○ | ○ |
| 15 | 23 | 61 | 6.0 | 0.6 | ○ | ○ | ○ | ○ |
| 16 | 25 | 66 | 6.5 | 0.6 | ○ | ○ | ○ | ○ |
| 17 | 33 | 87 | 8.6 | 0.8 | ○ | ○ | ○ | ○ |
| 18 | 28 | 74 | 7.3 | 0.7 | ○ | ○ | ○ | ○ |
| 19 | 25 | 66 | 6.5 | 0.6 | ○ | ○ | ○ | ○ |
| 20 | 31 | 82 | 8.1 | 0.8 | ○ | ○ | ○ | ○ |
| 21 | 23 | 61 | 0.6 | 0.6 | ○ | ○ | ○ | ○ |
| 22 | 28 | 74 | 7.3 | 0.7 | ○ | ○ | ○ | ○ |
| 23 | 31 | 82 | 8.1 | 0.8 | ○ | ○ | ○ | ○ |
| 24 | 33 | 87 | 8.6 | 0.8 | ○ | ○ | ○ | ○ |
| 25 | 31 | 82 | 8.1 | 0.8 | ○ | ○ | ○ | ○ |

TABLE 2-1-continued

| | Press formability Friction coefficient | | | Alkali degreasability Wetting ratio after degreasing | Appearance unevenness Rating | |
|---|---|---|---|---|---|---|
| No. | Condition 1 | Condition 2 | Condition 3 | % | (grade) | Remark |
| 1 | 0.175 | 0.235 | 0.310 | 100 | 5 | Comparative Example |
| 2 | 0.129 | 0.165 | 0.250 | 30 | 5 | Comparative Example |
| 3 | 0.167 | 0.229 | 0.261 | 60 | 2 | Comparative Example |
| 4 | 0.139 | 0.192 | 0.183 | 100 | 5 | Invention Example |
| 5 | 0.139 | 0.169 | 0.174 | 100 | 5 | Invention Example |
| 6 | 0.128 | 0.163 | 0.159 | 100 | 5 | Invention Example |
| 7 | 0.116 | 0.154 | 0.151 | 100 | 5 | Invention Example |
| 8 | 0.119 | 0.147 | 0.150 | 100 | 5 | Invention Example |
| 9 | 0.115 | 0.154 | 0.151 | 100 | 5 | Invention Example |
| 10 | 0.115 | 0.152 | 0.153 | 100 | 5 | Invention Example |
| 11 | 0.120 | 0.164 | 0.155 | 100 | 5 | Invention Example |
| 12 | 0.120 | 0.163 | 0.160 | 100 | 5 | Invention Example |
| 13 | 0.132 | 0.174 | 0.179 | 100 | 5 | Invention Example |
| 14 | 0.134 | 0.176 | 0.178 | 100 | 5 | Invention Example |
| 15 | 0.142 | 0.185 | 0.176 | 100 | 5 | Invention Example |
| 16 | 0.134 | 0.180 | 0.173 | 100 | 5 | Invention Example |
| 17 | 0.120 | 0.165 | 0.160 | 100 | 5 | Invention Example |
| 18 | 0.129 | 0.170 | 0.178 | 100 | 5 | Invention Example |
| 19 | 0.132 | 0.182 | 0.175 | 100 | 5 | Invention Example |
| 20 | 0.120 | 0.165 | 0.162 | 100 | 5 | Invention Example |
| 21 | 0.133 | 0.177 | 0.175 | 100 | 5 | Invention Example |
| 22 | 0.130 | 0.168 | 0.163 | 100 | 5 | Invention Example |
| 23 | 0.125 | 0.168 | 0.161 | 100 | 5 | Invention Example |
| 24 | 0.127 | 0.167 | 0.160 | 100 | 5 | Invention Example |
| 25 | 0.126 | 0.167 | 0.159 | 100 | 5 | Invention Example |

*○: Existence was confirmed, X: Existence was not confirmed, Crystal structure; $Zn_4(SO_4)_{1-X}(CO_3)_X(OH)_6$—$nH_2O$

TABLE 2-2

| | Oxide layer analytic results | | | | | | | |
|---|---|---|---|---|---|---|---|---|
| No. | Thickness (O) (nm) | Zn (mg/m$^2$) | S (mg/m$^2$) | C (mg/m$^2$) | Existence of zinc hydroxide | Existence of sulfate | Existence of carbonate | Incorporation of crystal structure |
| 26 | 31 | 82 | 8.1 | 0.1 | ○ | ○ | X | X |
| 27 | 30 | 79 | 7.8 | 0.2 | ○ | ○ | ○ | ○ |
| 28 | 31 | 82 | 8.1 | 0.8 | ○ | ○ | ○ | ○ |
| 29 | 32 | 84 | 7.8 | 1.0 | ○ | ○ | ○ | ○ |
| 30 | 30 | 79 | 6.8 | 1.1 | ○ | ○ | ○ | ○ |
| 31 | 30 | 79 | 5.8 | 1.5 | ○ | ○ | ○ | ○ |
| 32 | 33 | 87 | 8.6 | 0.8 | ○ | ○ | ○ | ○ |
| 33 | 33 | 87 | 8.6 | 0.8 | ○ | ○ | ○ | ○ |
| 34 | 32 | 84 | 8.3 | 0.8 | ○ | ○ | ○ | ○ |
| 35 | 30 | 79 | 7.8 | 0.7 | ○ | ○ | ○ | ○ |
| 36 | 30 | 79 | 7.8 | 0.7 | ○ | ○ | ○ | ○ |
| 37 | 32 | 84 | 8.3 | 0.8 | ○ | ○ | ○ | ○ |
| 38 | 31 | 82 | 8.1 | 0.8 | ○ | ○ | ○ | ○ |
| 39 | 33 | 87 | 0.0 | 0.0 | X | X | X | X |
| 40 | 30 | 79 | 0.0 | 0.0 | X | X | X | X |
| 41 | 33 | 87 | 8.6 | 0.8 | ○ | ○ | ○ | ○ |
| 42 | 32 | 84 | 8.3 | 0.8 | ○ | ○ | ○ | ○ |
| 43 | 31 | 82 | 8.1 | 0.8 | ○ | ○ | ○ | ○ |
| 44 | 30 | 79 | 7.8 | 0.7 | ○ | ○ | ○ | ○ |
| 45 | 32 | 84 | 8.3 | 0.8 | ○ | ○ | ○ | ○ |
| 46 | 34 | 90 | 8.8 | 0.8 | ○ | ○ | ○ | ○ |
| 47 | 33 | 87 | 8.6 | 0.8 | ○ | ○ | ○ | ○ |
| 48 | 31 | 82 | 8.1 | 0.8 | ○ | ○ | ○ | ○ |
| 49 | 35 | 92 | 9.1 | 0.9 | ○ | ○ | ○ | ○ |
| 50 | 36 | 95 | 9.4 | 0.9 | ○ | ○ | ○ | ○ |
| 51 | 33 | 87 | 8.6 | 0.8 | ○ | ○ | ○ | ○ |
| 52 | 31 | 82 | 8.1 | 0.0 | ○ | ○ | X | X |
| 53 | 31 | 82 | 8.1 | 0.0 | ○ | ○ | X | X |
| 54 | 32 | 84 | 8.3 | 0.0 | ○ | ○ | X | X |
| 55 | 31 | 82 | 8.1 | 0.0 | ○ | ○ | X | X |

TABLE 2-2-continued

| | Press formability Friction coefficient | | | Alkali degreasability Wetting ratio after degreasing | Appearance unevenness Rating | |
|---|---|---|---|---|---|---|
| No. | Condition 1 | Condition 2 | Condition 3 | % | (grade) | Remark |
| 26 | 0.123 | 0.159 | 0.205 | 80 | 3 | Comparative Example |
| 27 | 0.121 | 0.162 | 0.180 | 100 | 4 | Invention Example |
| 28 | 0.122 | 0.168 | 0.159 | 100 | 5 | Invention Example |
| 29 | 0.125 | 0.165 | 0.155 | 100 | 5 | Invention Example |
| 30 | 0.128 | 0.163 | 0.153 | 100 | 5 | Invention Example |
| 31 | 0.128 | 0.163 | 0.149 | 100 | 5 | Invention Example |
| 32 | 0.126 | 0.159 | 0.163 | 100 | 5 | Invention Example |
| 33 | 0.126 | 0.159 | 0.159 | 100 | 5 | Invention Example |
| 34 | 0.117 | 0.166 | 0.168 | 100 | 5 | Invention Example |
| 35 | 0.128 | 0.164 | 0.160 | 100 | 5 | Invention Example |
| 36 | 0.128 | 0.164 | 0.160 | 100 | 5 | Invention Example |
| 37 | 0.123 | 0.167 | 0.165 | 100 | 5 | Invention Example |
| 38 | 0.122 | 0.167 | 0.159 | 100 | 5 | Invention Example |
| 39 | 0.121 | 0.165 | 0.251 | 100 | 5 | Comparative Example |
| 40 | 0.127 | 0.180 | 0.259 | 100 | 5 | Comparative Example |
| 41 | 0.122 | 0.164 | 0.169 | 100 | 5 | Invention Example |
| 42 | 0.122 | 0.160 | 0.165 | 100 | 5 | Invention Example |
| 43 | 0.123 | 0.178 | 0.168 | 100 | 5 | Invention Example |
| 44 | 0.129 | 0.171 | 0.163 | 100 | 5 | Invention Example |
| 45 | 0.131 | 0.173 | 0.160 | 100 | 5 | Invention Example |
| 46 | 0.138 | 0.182 | 0.162 | 100 | 5 | Invention Example |
| 47 | 0.136 | 0.189 | 0.166 | 100 | 5 | Invention Example |
| 48 | 0.132 | 0.186 | 0.175 | 100 | 5 | Invention Example |
| 49 | 0.139 | 0.187 | 0.169 | 100 | 5 | Invention Example |
| 50 | 0.136 | 0.184 | 0.159 | 100 | 5 | Invention Example |
| 51 | 0.125 | 0.170 | 0.160 | 100 | 5 | Invention Example |
| 52 | 0.126 | 0.160 | 0.249 | 60 | 5 | Comparative Example |
| 53 | 0.123 | 0.159 | 0.234 | 60 | 5 | Comparative Example |
| 54 | 0.125 | 0.160 | 0.233 | 60 | 5 | Comparative Example |
| 55 | 0.125 | 0.160 | 0.251 | 60 | 5 | Comparative Example |

*○: Existence was confirmed, X: Existence was not confirmed, Crystal structure: $Zn_4(SO_4)_{1-X}(CO_3)_X(OH)_6—nH_2O$ The followings are found from Tables 1 and 2:

In Comparative Example No. 1 in which no film forming treatment was conducted, the oxide layer had a thickness less than 10 nm and the press formability was poor. No. 2 is an unsatisfactory example (comparative example) in which although the oxidation treatment and the neutralization treatment were performed, the neutralization treatment solution did not contain carbonate ions. The C coating weight in the oxide layer was insufficient, and although some items related to press formability and appearance were satisfactory, some items of press formability were insufficient and degreasability was poor.

No. 3 is an insufficient example (comparative example) in which although the oxidation treatment and the neutralization treatment were conducted and P ions were contained in the neutralization treatment solution, carbonate ions were not contained. The C coating weight in the oxide layer was insufficient, degreasability and appearance unevenness were insufficient, and some items related to press formability were low, if not insufficient. Some items related to press formability were insufficient.

No. 26 is an insufficient example (comparative example) in which not enough carbonate ions were added to the neutralization treatment solution. The C coating weight in the oxide layer was deficient, and although some items related to press formability were satisfactory, some items of press formability, degreasability, and appearance unevenness were insufficient.

Nos. 39 and 40 are insufficient examples (comparative examples) in which not enough sulfate ions were present in the treatment solution for forming the oxide layer. Some items related to press formability were satisfactory, but the oxide layer did not contain S or C, and some items related to press formability, degreasability, and appearance unevenness were insufficient.

Nos. 52 to 54 are insufficient examples (comparative examples) in which although enough carbonate ions are present in the neutralization treatment solution, the pH was outside the range of 9 to 12. Although some items related to press formability were satisfactory, the oxide layer did not contain a sufficient amount of C, and some items related to press formability and degreasability were insufficient.

No. 55 is a comparative example in which washing with water (washing with water in the oxide layer forming step) was not conducted between the oxide forming treatment and the neutralization treatment. The film could not capture enough C, and although some items related to press formability were satisfactory, some items relates to press formability and degreasability were insufficient.

Nos. 4 to 25, 27 to 38, and 41 to 51 are invention examples in which the oxide layer forming treatment and the neutralization treatment were carried out under conditions within preferable ranges. The oxide layer contained sufficient amounts of Zn, S, and C. Under all conditions, press formability was excellent, degreasability was satisfactory, and the appearance unevenness rating was Grade 4 or higher.

No. 27 was subjected to detailed film analysis.

Results of gas chromatograph mass spectroscopy confirmed release of $CO_2$ in the range of 150° C. to 500° C., and found that C existed as a carbonate.

An X-ray photoelectron spectrometer was used to conduct analysis. The peak corresponding to Zn LMM was observed at around 987 eV, which showed that Zn existed as zinc hydroxide.

Similarly, the peak corresponding to S 2p was observed at around 171 eV, which showed that S exited as a sulfate.

Results of differential thermogravimetric analysis found a decrease of 11.2% in weight at 100° C. or lower, which showed that water of crystallization was contained.

Results of X-ray diffraction found that diffraction peaks were observed at 2θ of about 8.5°, 15.0°, 17.4°, 21.3°, 23.2°, 26.3°, 27.7°, 28.7°, 32.8°, 34.1°, 58.6°, and 59.4°.

The above-described results, compositional ratios, and charge balance showed that a crystal structure substance represented by $Zn_4(SO_4)_{0.95}(CO_3)_{0.05}(OH)_6 \cdot 3.3H_2O$ was contained.

No. 28 was subjected to detailed film analysis.

Results of gas chromatograph mass spectroscopy confirmed release of $CO_2$ in the range of 150° C. to 500° C., and found that C existed as a carbonate.

An X-ray photoelectron spectrometer was used to conduct analysis. The peak corresponding to Zn LMM was observed at around 987 eV, which showed that Zn existed as zinc hydroxide.

Similarly, the peak corresponding to S 2p was observed at around 171 eV, which showed that S exited as a sulfate.

Results of differential thermogravimetric analysis found a decrease of 9.4% in weight at 100° C. or lower, which showed that water of crystallization was contained.

Results of X-ray diffraction found that diffraction peaks were observed at 2θ of about 8.8°, 15.0°, 17.9°, 21.3°, 23.2°, 27.0°, 29.2°, 32.9°, 34.7°, and 58.9°.

The above-described results, compositional ratios, and charge balance showed that a crystal structure substance represented by $Zn_4(SO_4)_{0.8}(CO_3)_{0.2}(OH)_6 \cdot 2.7H_2O$ was contained.

No. 29 was subjected to detailed film analysis.

Results of gas chromatograph mass spectroscopy confirmed release of $CO_2$ in the range of 150° C. to 500° C., and found that C existed as a carbonate.

An X-ray photoelectron spectrometer was used to conduct analysis. The peak corresponding to Zn LMM was observed at around 987 eV, which showed that Zn existed as zinc hydroxide.

Similarly, the peak corresponding to S 2p was observed at around 171 eV, which showed that S exited as a sulfate.

Results of differential thermogravimetric analysis found a decrease of 35.5% in weight at 100° C. or lower, which showed that water of crystallization was contained.

Results of X-ray diffraction found that diffraction peaks were observed at 2θ of about 8.9°, 15.0°, 18.3°, 21.3°, 23.2°, 27.4°, 29.5°, 32.9°, 34.7°, and 58.9°.

The above-described results, compositional ratios, and charge balance showed that a crystal structure substance represented by $Zn_4(SO_4)_{0.75}(CO_3)_{0.25}(OH)_6 \cdot 10.0H_2O$ was contained.

No. 30 was subjected to detailed film analysis.

Results of gas chromatograph mass spectroscopy confirmed release of $CO_2$ in the range of 150° C. to 500° C., and found that C existed as a carbonate.

An X-ray photoelectron spectrometer was used to conduct analysis. The peak corresponding to Zn LMM was observed at around 987 eV, which showed that Zn existed as zinc hydroxide.

Similarly, the peak corresponding to S 2p was observed at around 171 eV, which showed that S exited as a sulfate.

Results of differential thermogravimetric analysis found no significant decrease in weight at 100° C. or lower, which showed that water of crystallization was not contained.

Results of X-ray diffraction found that diffraction peaks were observed at 2θ of about 8.9°, 15.0°, 18.3°, 21.3°, 23.2°, 27.4°, 29.5°, 32.9°, 34.7°, and 58.9°.

The above-described results, compositional ratios, and charge balance showed that a crystal structure substance represented by $Zn_4(SO_4)_{0.7}(CO_3)_{0.3}(OH)_6$ was contained.

No. 31 was subjected to detailed film analysis.

Results of gas chromatograph mass spectroscopy confirmed release of $CO_2$ in the range of 150° C. to 500° C., and found that C existed as a carbonate.

An X-ray photoelectron spectrometer was used to conduct analysis. The peak corresponding to Zn LMM was observed at around 987 eV, which showed that Zn existed as zinc hydroxide.

Similarly, the peak corresponding to S 2p was observed at around 171 eV, which showed that S exited as a sulfate.

Results of differential thermogravimetric analysis found a decrease of 18.6% in weight at 100° C. or lower, which showed that water of crystallization was contained.

Results of X-ray diffraction found that diffraction peaks were observed at 2θ of about 9.1°, 15.0°, 18.4°, 21.3°, 23.2°, 27.7°, 29.7°, 32.9°, 34.7°, and 58.9°.

The above-described results, compositional ratios, and charge balance showed that a crystal structure substance represented by $Zn_4(SO_4)_{0.6}(CO_3)_{0.4}(OH)_6 \cdot 5.0H_2O$ was contained.

For other examples also, the same procedures were performed to confirm existence of the zinc hydroxide, sulfate, and carbonate, and whether a crystal structure represented by $Zn_4(SO_4)_{1-x}(CO_3)_x(OH)_6 \cdot nH_2O$ was incorporated. Samples in which existence of those substances and incorporation of water of crystallization were confirmed are indicated by circles, and samples in which existence of those substances and incorporation of water of crystallization were not confirmed are indicated by Xs to show the results of the studies in Table 2 (presence or absence of water of crystallization is not indicated in the table). These results show that in invention examples, as with Nos. 27 to 29 and 31, zinc hydroxide, a sulfate, a carbonate, and water of crystallization are present and a crystal structure substance represented by $Zn_4(SO_4)_{1-x}(CO_3)_x(OH)_6 \cdot nH_2O$ is contained.

EXAMPLE 2

A cold-rolled steel sheet having a thickness of 0.7 mm was subjected to hot-dip galvanizing treatment and the resulting steel sheet was temper rolled. Subsequently, a surface activation treatment with an alkaline aqueous solution was conducted by using an alkaline aqueous solution adjusted to the conditions shown in Table 3. Then, as the reaction layer forming treatment, the steel sheet was immersed in a sulfuric acid acidic solution controlled to the conditions shown in Table 3, roll-squeezed, and then held for a particular time shown in Table 3. After washing the resulting steel sheet thoroughly with water, the steel sheet was dried. Then a neutralization treatment was conducted under the conditions shown in Table 3. The sulfate ion concentration in the sulfuric acid acidic solution was 15 g/L.

The hot-dip galvanized steel sheet obtained as above was analyzed to determine the thickness of the oxide layer on the surface. The details of the oxide layer, press formability (sliding properties), degreasability, and appearance unevenness were also evaluated by the same procedures as in Example 1.

The results obtained as above are shown in Table 4.

TABLE 3

| No. | Activation Treatment Alkaline aqueous solution Type of chemical | Concentration (g/L) | Temperature (° C.) | pH | Immersion time (sec) | Oxide layer forming treatment Acidic solution Type of chemical | pH buffer Concentration (g/L) | pH adjustor Type of chemical | pH | pH-increasing property | Temperature (° C.) |
|---|---|---|---|---|---|---|---|---|---|---|---|
| 1 | — | — | — | — | — | No treatment | — | — | — | — | — |
| 2 | — | — | — | — | — | Sodium acetate•Trihydrate | 30 | Sulfuric acid | 1.5 | 0.20 | 35 |
| 3 | | | | | | | | | | | |
| 4 | | | | | | Sodium acetate•Trihydrate | 30 | Sulfuric acid | 1.5 | 0.20 | 35 |
| 5 | | | | | | | | | | | |
| 6 | | | | | | | | | | | |
| 7 | | | | | | | | | | | |
| 8 | | | | | | | | | | | |
| 9 | NaOH | 0.1 | 50 | 10.0 | 5 | Sodium acetate•Trihydrate | 30 | Sulfuric acid | 1.5 | 0.20 | 35 |
| 10 | | 1 | | 12.0 | | | | | | | |
| 11 | | 5 | | 12.5 | | | | | | | |
| 12 | | 10 | | 13.0 | | | | | | | |
| 13 | | 100 | | 14.0 | | | | | | | |
| 14 | NaOH | 5 | 20 | 12.5 | 5 | Sodium acetate•Trihydrate | 30 | Sulfuric acid | 1.5 | 0.20 | 35 |
| 15 | | | 30 | | | | | | | | |
| 16 | | | 40 | | | | | | | | |
| 17 | | | 60 | | | | | | | | |
| 18 | | | 70 | | | | | | | | |

| No. | Oxide layer forming treatment Coating weight of acidic solution film (g/m²) | Holding time (sec) | Washing with water | Neutralization treatment Alkaline aqueous solution Chemicals added and concentration Type of chemical | Concentration (g/L) | Carbonate ion Concentration (g/L) | pH | Stirring (rpm) | Temperature (° C.) | Immersion time (sec) |
|---|---|---|---|---|---|---|---|---|---|---|
| 1 | — | — | — | — | — | — | — | — | — | — |
| 2 | 5 | 10 | Yes | None | — | — | 6.7 | 150 | 50 | 3 |
| 3 | | 10 | | Sodium pyrophosphate | 9.8 | 0.00 | 10.17 | 150 | 50 | 3 |
| 4 | 5 | 3 | Yes | Sodium carbonate | 2.86 | 0.60 | 10.54 | 150 | 50 | 3 |
| 5 | | 5 | | | | | | | | |
| 6 | | 10 | | | | | | | | |
| 7 | | 30 | | | | | | | | |
| 8 | | 60 | | | | | | | | |
| 9 | 5 | 10 | Yes | Sodium carbonate | 2.86 | 0.60 | 10.54 | 150 | 50 | 3 |
| 10 | | 10 | | | | | | | | |
| 11 | | 10 | | | | | | | | |
| 12 | | 10 | | | | | | | | |
| 13 | | 10 | | | | | | | | |
| 14 | 5 | 10 | Yes | Sodium carbonate | 2.86 | 0.60 | 10.54 | 150 | 50 | 3 |
| 15 | | 10 | | | | | | | | |
| 16 | | 10 | | | | | | | | |
| 17 | | 10 | | | | | | | | |
| 18 | | 10 | | | | | | | | |

TABLE 4

| No. | Oxide layer analytic results Thickness (O) (nm) | Zn (mg/m²) | S (mg/m²) | C (mg/m²) | Existence of zinc hydroxide | Existence of sulfate | Existence of carbonate | Incorporaton of crystal structure |
|---|---|---|---|---|---|---|---|---|
| 1 | 8 | 21 | 0.0 | 0.0 | X | X | X | X |
| 2 | 28 | 74 | 9.1 | 0.0 | ○ | ○ | X | X |
| 3 | 14 | 37 | 4.5 | 0.0 | ○ | ○ | X | X |
| 4 | 20 | 53 | 5.2 | 0.5 | ○ | ○ | ○ | ○ |
| 5 | 23 | 61 | 6.0 | 0.6 | ○ | ○ | ○ | ○ |
| 6 | 28 | 74 | 7.3 | 0.7 | ○ | ○ | ○ | ○ |
| 7 | 42 | 111 | 10.9 | 1.0 | ○ | ○ | ○ | ○ |
| 8 | 51 | 135 | 13.3 | 1.2 | ○ | ○ | ○ | ○ |
| 9 | 32 | 84 | 8.3 | 0.8 | ○ | ○ | ○ | ○ |
| 10 | 45 | 119 | 11.7 | 1.1 | ○ | ○ | ○ | ○ |

TABLE 4-continued

| | | | | | | | | |
|---|---|---|---|---|---|---|---|---|
| 11 | 63 | 166 | 16.4 | 1.5 | ○ | ○ | ○ | ○ |
| 12 | 62 | 164 | 16.1 | 1.5 | ○ | ○ | ○ | ○ |
| 13 | 65 | 172 | 16.9 | 1.6 | ○ | ○ | ○ | ○ |
| 14 | 45 | 119 | 11.7 | 1.1 | ○ | ○ | ○ | ○ |
| 15 | 59 | 156 | 15.3 | 1.4 | ○ | ○ | ○ | ○ |
| 16 | 61 | 161 | 15.9 | 1.5 | ○ | ○ | ○ | ○ |
| 17 | 62 | 164 | 16.1 | 1.5 | ○ | ○ | ○ | ○ |
| 18 | 64 | 169 | 16.6 | 1.6 | ○ | ○ | ○ | ○ |

| | Press formability Friction coefficient | | | Alkali degreasability Wetting ratio after degreasing | Appearance unevenness Rating | |
|---|---|---|---|---|---|---|
| No. | Condition 1 | Condition 2 | Condition 3 | % | (grade) | Remark |
| 1 | 0.146 | 0.296 | 0.352 | 100 | 5 | Comparative Example |
| 2 | 0.099 | 0.189 | 0.250 | 30 | 5 | Comparative Example |
| 3 | 0.132 | 0.253 | 0.312 | 60 | 2 | Comparative Example |
| 4 | 0.111 | 0.185 | 0.183 | 100 | 5 | Invention Example |
| 5 | 0.108 | 0.181 | 0.179 | 100 | 5 | Invention Example |
| 6 | 0.096 | 0.179 | 0.175 | 100 | 5 | Invention Example |
| 7 | 0.094 | 0.176 | 0.156 | 100 | 5 | Invention Example |
| 8 | 0.090 | 0.163 | 0.156 | 100 | 5 | Invention Example |
| 9 | 0.086 | 0.193 | 0.162 | 100 | 5 | Invention Example |
| 10 | 0.080 | 0.190 | 0.159 | 100 | 5 | Invention Example |
| 11 | 0.075 | 0.156 | 0.155 | 100 | 5 | Invention Example |
| 12 | 0.073 | 0.153 | 0.153 | 100 | 5 | Invention Example |
| 13 | 0.076 | 0.158 | 0.150 | 100 | 5 | Invention Example |
| 14 | 0.086 | 0.175 | 0.163 | 100 | 5 | Invention Example |
| 15 | 0.079 | 0.155 | 0.162 | 100 | 5 | Invention Example |
| 16 | 0.077 | 0.154 | 0.160 | 100 | 5 | Invention Example |
| 17 | 0.078 | 0.159 | 0.166 | 100 | 5 | Invention Example |
| 18 | 0.073 | 0.152 | 0.160 | 100 | 5 | Invention Example |

*○: Existence was confirmed, X: Existence was not confirmed, Crystal structure: $Zn_4(SO_4)_{1-x}(CO_3)_x(OH)_6 \cdot nH_2O$ The followings can be found from Tables 3 and 4. In Comparative Example No. 1 in which no film forming treatment was conducted, the thickness of the oxide layer was less than 10 nm, and the press formability was poor.

No. 2 is an insufficient example (comparative example) in which carbonate ions were not added to the neutralization treatment solution although the oxidizing treatment and the neutralization treatment were conducted. Some items related to press formability and appearance unevenness were satisfactory, but the oxide layer did not contain a sufficient amount of C and the degreasability was poor.

No. 3 is an insufficient example (comparative example) in which, although the oxidizing treatment and the neutralization treatment were conducted and the neutralization treatment solution contained P ions, carbonate ions were not added. The oxide layer did not contain a sufficient amount of C, degreasability and appearance unevenness were insufficient, and press formability was low, if not insufficient, due to dissolution of the oxide film.

Nos. 4 to 8 are invention examples in which the oxidizing treatment and the neutralization treatment were conducted under conditions within preferable ranges. The oxide layer contained sufficient amounts of Zn, S, and C, press formability was excellent, and degreasability and appearance unevenness were satisfactory.

Nos. 9 to 18 are invention example in which the activation treatment, the oxidizing treatment, and the neutralization treatment were conducted under conditions within preferable ranges. In these samples, the oxide layer contained sufficient amounts of Zn, S, and C, press formability was excellent, and degreasability and appearance unevenness were satisfactory.

For all examples of Example 2, the existence of the zinc hydroxide, sulfate, and carbonate, and whether a crystal structure represented by $Zn_4(SO_4)_{1-x}(CO_3)_x(OH)_6 \cdot nH_2O$ is incorporated were studied by the same procedures as in Example 1. Samples in which existence of those substances and incorporation of water of crystallization were confirmed are indicated by circles, and samples in which existence of those substances and incorporation of water of crystallization were not confirmed are indicated by Xs to show the results of the studies in Table 4 (presence or absence of water of crystallization is not indicated in the table). These results show that in invention examples, as with Nos. 27 to 29, and 31 in Example 1, zinc hydroxide, a sulfate, a carbonate, and water of crystallization are present and a crystal structure represented by $Zn_4(SO_4)_{1-x}(CO_3)_x(OH)_6 \cdot nH_2O$ is contained.

EXAMPLE 3

A cold-rolled steel sheet having a thickness of 0.7 mm was subjected to electrogalvanizing treatment. A surface activation treatment with an alkaline aqueous solution was conducted with an alkaline aqueous solution adjusted to conditions shown in Table 5. Then an oxide layer forming treatment was conducted in which the steel sheet was immersed in a sulfuric acid acidic solution controlled to the conditions shown in Table 5, roll-squeezed, and then held for a particular time shown in Table 5. The steel sheet was thoroughly washed with water and dried. Then a neutralization treatment was conducted under the conditions shown in Table 5. The sulfate ion concentration in the sulfuric acid acidic solution was 15 g/L.

The electrogalvanized steel sheet obtained as above was analyzed to determine the thickness of the oxide layer on the surface. The details of the oxide layer, press formability (sliding properties), and degreasability were also evaluated by the same procedures as in Example 1. The results obtained as above are shown in Table 6.

TABLE 5

| | Activation Treatment | | | | | Oxide layer forming treatment | | | | | |
|---|---|---|---|---|---|---|---|---|---|---|---|
| | Alkaline aqueous solution | | | | | Acidic solution | | | | | |
| | | | | | | pH buffer | | pH adjustor | | pH- | |
| No. | Type of chemical | Concentration (g/L) | Temperature (° C.) | pH | Immersion time (sec) | Type of chemical | Concentration (g/L) | Type of chemical | pH | increasing property | Temperature (° C.) |
| 1 | — | — | — | — | — | No treatment | — | — | — | — | — |
| 2 | — | — | — | — | — | Sodium acetate•Trihydrate | 30 | Sulfuric acid | 1.5 | 0.20 | 35 |
| 3 | | | | | | | | | | | |
| 4 | — | — | — | — | — | Sodium acetate•Trihydrate | 30 | Sulfuric acid | 1.5 | 0.20 | 35 |
| 5 | | | | | | | | | | | |
| 6 | | | | | | | | | | | |
| 7 | | | | | | | | | | | |
| 8 | | | | | | | | | | | |
| 9 | NaOH | 0.1 | 50 | 10.0 | 5 | Sodium acetate•Trihydrate | 30 | Sulfuric acid | 1.5 | 0.20 | 35 |
| 10 | | 1 | | 12.0 | | | | | | | |
| 11 | | 5 | | 12.5 | | | | | | | |
| 12 | | 10 | | 13.0 | | | | | | | |
| 13 | | 100 | | 14.0 | | | | | | | |
| 14 | NaOH | 5 | 20 | 12.5 | 5 | Sodium acetate•Trihydrate | 30 | Sulfuric acid | 1.5 | 0.20 | 35 |
| 15 | | | 30 | | | | | | | | |
| 16 | | | 40 | | | | | | | | |
| 17 | | | 60 | | | | | | | | |
| 18 | | | 70 | | | | | | | | |

| | Oxide layer forming treatment | | | Neutralization treatment | | | | | | |
|---|---|---|---|---|---|---|---|---|---|---|
| | Coating | | | Alkaline aqueous solution Chemicals added and concentration | | Carbonate ion | | | | Immersion |
| No. | weight of acidic solution film (g/m²) | Holding time (sec) | Washing with water | Type of chemical | Concentration (g/L) | Concentration (g/L) | pH | Stirring (rpm) | Temperature (° C.) | time (sec) |
| 1 | — | — | — | — | — | — | — | — | — | — |
| 2 | 5 | 10 | Yes | None | — | — | 6.7 | 150 | 50 | 3 |
| 3 | | 10 | | Sodium pyrophosphate | 9.8 | 0.00 | 10.17 | 150 | 50 | 3 |
| 4 | 5 | 3 | Yes | Sodium carbonate | 2.86 | 0.60 | 10.54 | 150 | 50 | 3 |
| 5 | | 5 | | | | | | | | |
| 6 | | 10 | | | | | | | | |
| 7 | | 30 | | | | | | | | |
| 8 | | 60 | | | | | | | | |
| 9 | 5 | 10 | Yes | Sodium carbonate | 2.86 | 0.60 | 10.54 | 150 | 50 | 3 |
| 10 | | 10 | | | | | | | | |
| 11 | | 10 | | | | | | | | |
| 12 | | 10 | | | | | | | | |
| 13 | | 10 | | | | | | | | |
| 14 | 5 | 10 | Yes | Sodium Carbonate | 2.86 | 0.60 | 10.54 | 150 | 50 | 3 |
| 15 | | 10 | | | | | | | | |
| 16 | | 10 | | | | | | | | |
| 17 | | 10 | | | | | | | | |
| 18 | | 10 | | | | | | | | |

TABLE 6

| | Oxide layer analytic results | | | | | | | |
|---|---|---|---|---|---|---|---|---|
| No. | Thickness (O) (nm) | Zn (mg/m²) | S (mg/m²) | C (mg/m²) | Existence of zinc hydroxide | Existence of sulfate | Existence of carbonate | Incorporaton of crystal structure |
| 1 | 5 | 13 | 0.0 | 0.0 | X | X | X | X |
| 2 | 31 | 82 | 10.1 | 0.0 | ◯ | ◯ | X | X |
| 3 | 15 | 40 | 4.9 | 0.0 | ◯ | ◯ | X | X |
| 4 | 20 | 53 | 5.2 | 0.5 | ◯ | ◯ | ◯ | ◯ |
| 5 | 23 | 61 | 6.0 | 0.6 | ◯ | ◯ | ◯ | ◯ |
| 6 | 31 | 82 | 8.1 | 0.8 | ◯ | ◯ | ◯ | ◯ |

TABLE 6-continued

| | | | | | | | | |
|---|---|---|---|---|---|---|---|---|
| 7 | 40 | 106 | 10.4 | 1.0 | ○ | ○ | ○ | ○ |
| 8 | 50 | 132 | 13.0 | 1.2 | ○ | ○ | ○ | ○ |
| 9 | 26 | 69 | 6.8 | 0.6 | ○ | ○ | ○ | ○ |
| 10 | 46 | 121 | 12.0 | 1.1 | ○ | ○ | ○ | ○ |
| 11 | 62 | 164 | 16.1 | 1.5 | ○ | ○ | ○ | ○ |
| 12 | 64 | 169 | 16.6 | 1.6 | ○ | ○ | ○ | ○ |
| 13 | 63 | 166 | 16.4 | 1.5 | ○ | ○ | ○ | ○ |
| 14 | 40 | 106 | 10.4 | 1.0 | ○ | ○ | ○ | ○ |
| 15 | 58 | 153 | 15.1 | 1.4 | ○ | ○ | ○ | ○ |
| 16 | 62 | 164 | 16.1 | 1.5 | ○ | ○ | ○ | ○ |
| 17 | 61 | 161 | 15.9 | 1.5 | ○ | ○ | ○ | ○ |
| 18 | 64 | 169 | 16.6 | 1.6 | ○ | ○ | ○ | ○ |

| | Press formability Friction coefficient | | | Alkali degreasability Wetting ratio after degreasing | Appearance unevenness Rating | |
|---|---|---|---|---|---|---|
| No. | Condition 1 | Condition 2 | Condition 3 | % | (grade) | Remark |
| 1 | 0.172 | 0.305 | 0.326 | 100 | 5 | Comparative Example |
| 2 | 0.099 | 0.189 | 0.263 | 30 | 5 | Comparative Example |
| 3 | 0.132 | 0.253 | 0.293 | 60 | 2 | Comparative Example |
| 4 | 0.099 | 0.199 | 0.183 | 100 | 5 | Invention Example |
| 5 | 0.095 | 0.195 | 0.175 | 100 | 5 | Invention Example |
| 6 | 0.093 | 0.190 | 0.169 | 100 | 5 | Invention Example |
| 7 | 0.089 | 0.185 | 0.160 | 100 | 5 | Invention Example |
| 8 | 0.080 | 0.176 | 0.159 | 100 | 5 | Invention Example |
| 9 | 0.096 | 0.190 | 0.180 | 100 | 5 | Invention Example |
| 10 | 0.086 | 0.186 | 0.160 | 100 | 5 | Invention Example |
| 11 | 0.075 | 0.156 | 0.153 | 100 | 5 | Invention Example |
| 12 | 0.074 | 0.157 | 0.155 | 100 | 5 | Invention Example |
| 13 | 0.073 | 0.160 | 0.150 | 100 | 5 | Invention Example |
| 14 | 0.076 | 0.169 | 0.162 | 100 | 5 | Invention Example |
| 15 | 0.070 | 0.160 | 0.158 | 100 | 5 | Invention Example |
| 16 | 0.075 | 0.150 | 0.155 | 100 | 5 | Invention Example |
| 17 | 0.076 | 0.153 | 0.156 | 100 | 5 | Invention Example |
| 18 | 0.073 | 0.156 | 0.150 | 100 | 5 | Invention Example |

*○: Existence was confirmed, X: Existence was not confirmed, Crystal structure: $Zn_4(SO_4)_{1-x}(CO_3)_x(OH)_6 \cdot nH_2O$ The followings can be found from Tables 5 and 6. In Comparative Example No. 1 in which no film forming treatment was conducted, the thickness of the oxide layer was less than 10 nm, and the press formability was poor.

No. 2 is an insufficient example (comparative example) in which carbonate ions were not added to the neutralization treatment solution although the oxidizing treatment and the neutralization treatment were conducted. Press formability and appearance unevenness were satisfactory, but the oxide layer did not contain a sufficient amount of C and the degreasability was poor.

No. 3 is an insufficient example (comparative example) in which, although the oxidizing treatment and the neutralization treatment were conducted and the neutralization treatment solution contained P ions, carbonate ions were not contained. The oxide layer did not contain a sufficient amount of C, degreasability and appearance unevenness were insufficient, and press formability was low, if not insufficient.

Nos. 4 to 8 are invention examples in which the oxidizing treatment and the neutralization treatment were conducted under conditions within preferable ranges. The oxide layer contained sufficient amounts of Zn, S, and C, press formability was excellent, and degreasability was satisfactory.

Nos. 9 to 18 are invention example in which the activation treatment, the oxidizing treatment, and the neutralization treatment were conducted under conditions within preferable ranges. In these samples, the oxide layer contained sufficient amounts of Zn, S, and C, press formability was excellent, and degreasability was satisfactory.

For all examples of Example 3, the existence of the zinc hydroxide, sulfate, and carbonate, and whether a crystal structure represented by $Zn_4(SO_4)_{1-x}(CO_3)_x(OH)_6 \cdot nH_2O$ is incorporated were studied by the same procedures as in Example 1. Samples in which existence of those substances and incorporation of water of crystallization were confirmed are indicated by circles, and samples in which existence of those substances and incorporation of water of crystallization were not confirmed are indicated by Xs to show the results of the studies in Table 6 (presence or absence of water of crystallization is not indicated in the table). These results show that in invention examples, as with Nos. 27 to 29, and 31 in Example 1, zinc hydroxide, a sulfate, a carbonate, and water of crystallization are present and a crystal structure represented by $Zn_4(SO_4)_{1-x}(CO_3)_x(OH)_6 \cdot nH_2O$ is contained.

REFERENCE SIGNS LIST

1 friction coefficient measurement sample
2 sample table
3 slide table
4 roller
5 slide table supporting stage
6 bead
7 first load cell
8 second load cell
9 rail
N pressing load
F sliding resistance force
10 static friction coefficient measurement instrument
11 die 12 die
100 friction coefficient measurement sample
P pressing load
F' pull-out load

The invention claimed is:

1. A galvanized steel sheet comprising a steel sheet and a galvanized coating layer formed on the steel sheet,
wherein the coating layer includes an oxide layer in a surface layer, the oxide layer having an average thickness of 20 nm or more, and
the oxide layer consists of Zn, O, H, S, C, and unavoidable impurities, and contains 50 mg/m² or more of Zn, 5 mg/m² or more of S, and 0.2 mg/m² or more of C.

2. The galvanized steel sheet according to claim 1, wherein a sulfate group, a carbonate group, and a hydroxyl group exist in the oxide layer.

3. The galvanized steel sheet according to claim 1, wherein the oxide layer contains a crystal structure represented by $Zn_4(SO_4)_{1-x}(CO_3)_x(OH)_6 \cdot nH_2O$,
where X is a real number in the range of $0<X<1$ and n is a real number in the range of $0 \leq n \leq 10$.

4. The galvanized steel sheet according to claim 2, wherein the oxide layer contains a crystal structure represented by $Zn_4(SO_4)_{1-x}(CO_3)_x(OH)_6 \cdot nH_2O$,
where X is a real number in the range of $0<X<1$ and n is a real number in the range of $0 \leq n \leq 10$.

5. The galvanized steel sheet according to claim 1, wherein the galvanized steel sheet is a hot-dip galvannealed steel sheet, a hot-dip galvanized steel sheet, or an electrogalvanized steel sheet.

6. The galvanized steel sheet according to claim 2, wherein the galvanized steel sheet is a hot-dip galvannealed steel sheet, a hot-dip galvanized steel sheet, or an electrogalvanized steel sheet.

7. The galvanized steel sheet according to claim 3, wherein the galvanized steel sheet is a hot-dip galvannealed steel sheet, a hot-dip galvanized steel sheet, or an electrogalvanized steel sheet.

8. The galvanized steel sheet according to claim 4, wherein the galvanized steel sheet is a hot-dip galvannealed steel sheet, a hot-dip galvanized steel sheet, or an electrogalvanized steel sheet.

9. A method for producing the galvanized steel sheet according to claim 1, the method comprising:
an oxide layer forming step of bringing a galvanized steel sheet into contact with an acidic solution containing 0.3 g/L or more of sulfate ions, then holding the galvanized steel sheet in contact for 1 to 60 seconds, and then washing the galvanized steel sheet with water; and
a neutralization treatment step of holding a surface of an oxide layer, which has been formed in the oxide layer forming step, in contact with an alkaline aqueous solution having a pH of 9 to 12 for 0.5 seconds or longer, and then performing washing with water and drying,
wherein the alkaline aqueous solution contains 0.1 g/L or more of carbonate ions.

10. The method for producing the galvanized steel sheet according to claim 9, wherein the alkaline aqueous solution has a temperature of 20° C. to 70° C.

11. The method for producing the galvanized steel sheet according to claim 9, wherein the acidic solution has a pH buffering action and has a pH-increasing property in the range of 0.003 to 0.5, where the pH-increasing property is defined by an amount (L) of a 1.0 mol/L sodium hydroxide solution needed to increase a pH of 1 L of the acidic solution from 2.0 to 5.0.

12. The method for producing the galvanized steel sheet according to claim 9, wherein the acidic solution contains a total of 5 to 50 g/L of at least one salt selected from an acetate, a phthalate, a citrate, a succinate, a lactate, a tartrate, a borate, and a phosphate, and has a pH of 0.5 to 5.0 and a temperature of 20° C. to 70° C.

13. The method for producing the galvanized steel sheet according to claim 9, wherein, in the oxide layer forming step, an acidic solution coating weight on a steel sheet surface after contacting the acidic solution is 15 g/m² or less.

14. The method for producing the galvanized steel sheet according to claim 9, wherein the galvanized steel sheet is a hot-dip galvannealed steel sheet.

15. The method for producing the galvanized steel sheet according to claim 9, wherein the galvanized steel sheet is a hot-dip galvanized steel sheet.

16. The method for producing the galvanized steel sheet according to claim 9, wherein the galvanized steel sheet is an electrogalvanized steel sheet.

17. The method for producing the galvanized steel sheet according to claim 9, wherein a surface of the galvanized steel sheet is activated by bringing the surface of the galvanized steel sheet into contact with an alkaline aqueous solution before the oxide layer forming step.

18. The method for producing the galvanized steel sheet according to claim 9, wherein the galvanized steel sheet is temper rolled before the oxide layer forming step.

* * * * *